(12) United States Patent
Noy et al.

(10) Patent No.: US 6,907,581 B2
(45) Date of Patent: Jun. 14, 2005

(54) METHOD AND SYSTEM FOR IMPLICITLY RESOLVING POINTING AMBIGUITIES IN HUMAN-COMPUTER INTERACTION (HCI)

(75) Inventors: David Noy, Tel Aviv (IL); Yehezkel Yeshurun, Givataim (IL)

(73) Assignee: Ramot at Tel Aviv University Ltd., Tel Aviv (IL)

( * ) Notice: Subject to any disclaimer, the term of this patent is extended or adjusted under 35 U.S.C. 154(b) by 474 days.

(21) Appl. No.: 09/824,045

(22) Filed: Apr. 3, 2001

(65) Prior Publication Data

US 2003/0016252 A1 Jan. 23, 2003

(51) Int. Cl.$^7$ .............................................. G06F 3/00
(52) U.S. Cl. ....................... 715/863; 715/856; 715/857; 715/862
(58) Field of Search .............................. 345/764, 856, 345/857, 862, 863, 156, 157, 159; 706/21, 22

(56) References Cited

U.S. PATENT DOCUMENTS

| | | | | |
|---|---|---|---|---|
| 4,987,411 A | * | 1/1991 | Ishigami | 345/159 |
| 5,764,219 A | * | 6/1998 | Rutledge et al. | 345/159 |
| 5,818,437 A | | 10/1998 | Grover et al. | 345/811 |
| 6,362,842 B1 | * | 3/2002 | Tahara et al. | 345/856 |

OTHER PUBLICATIONS

'Direct Manipulation' as described by Shneiderman, B., in *The Future of Interactive Systems and The Emergence of Direct Manipulation*, Behavior and Information Technology 1, 1982, 237–256.
Myers, B.A., in Brief History of Human Computer Interaction Technology, ACM Interactions, 5(2), Mar. 1998, 44–54.
'Perceptual User Interfaces' paradigm as described by Turk, M. and Robertson, G., in Perceptual User Interfaces, Communications of the ACM, Mar. 2000, 43(3), 33–34.
Hutchins et. al., in Direct Manipulation Interfaces, User Centered System Design: New Perspectives on Human–computer Interaction, Norman, D.A. and Draper, S.W. (eds.), Lawrence Erlbaum, New Jersey, USA, 1986, 87–124.
Jacob, R.J.K., in A Specification Language for Direct Manipulation User Interfaces, ACM Transactions on Graphics, 5(4), 1986, 283–317.

(Continued)

*Primary Examiner*—John Cabeca
*Assistant Examiner*—Kieu D. Vu
(74) *Attorney, Agent, or Firm*—Mark M. Friedman

(57) ABSTRACT

A method and system for implicitly resolving pointing ambiguities in human-computer interaction by implicitly analyzing user movements of a pointer toward a user targeted object located in an ambiguous multiple object domain and predicting the user targeted object, using different categories of heuristic (statically and/or dynamically learned) measures, such as (i) implicit user pointing gesture measures, (ii) application context, and (iii) number of computer suggestions of each predicted user targeted object. Featured are user pointing gesture measures of (1) speed-accuracy tradeoff, referred to as total movement time (TMT), and, amount of fine tuning (AFT) or tail-length (TL), and, (2) exact pointer position. A particular application context heuristic measure used is referred to as containment hierarchy. The invention is widely applicable to resolving a variety of different types of pointing ambiguities such as composite object types of pointing ambiguities, involving different types of pointing devices, and which are widely applicable to essentially any type of software and/or hardware methodology involving using a pointer, such as in computer aided design (CAD), object based graphical editing, and text editing.

72 Claims, 7 Drawing Sheets

OTHER PUBLICATIONS

Draper, S.W., in Display Managers as the Basis for User–Machine Communication, User Centered System Design: New Perspectives on Human–computer Interaction, Norman, D.A. and Draper, S.W. (eds.), Lawrence Erlbaum, NJ, USA,1986, 339–352.

Buxton, B., in *HCI and the Inadequacies of Direct Manipulation Systems*, SIGCHI Bulletin, 25(1), 1993, 21–22.

Bolt, R.A., in Put–That–There: Voice and Gesture at the Graphics Interface, Computer Graphics, 14(3), 1980 262–270.

Kobsa et al., in *Combining Deitic Gestures and Natural Language for Referent Identification*, Proceedings of the 11th International Conference on computational Linguistics, Bonn, West Germany, 1986, 356–361.

Foley, J.D. et al. in Computer Graphics: Principles and Practice, Addison–Wesley, Reading, MA, USA, 1990.

Perez, M.A. and Sibert, J.L., in *Focus in Graphical User Interfaces*, Proceedings of the ACM International Workshop on Intelligent User Interfaces, Addison–Wesley/ACM Press, FL, USA, 1993.

Jacob, R.J.K., in *Natural Dialogue in Modes Other than Natural Language*, Dialogue and Instruction, Reun, R.J., Baker, M., and Reiner, M. (eds.), Springer–Verlang, Berlin, 1995, 289–301.

Saund, E. and Moran, T.P., in A Perceptually Supported Sketch Editor, Proceedings of the ACM Symposium on UI software and Technology, UIST, CA, USA, 1994, and in Perceptual Organization in an Interactive Sketch Editing Application, ICCV, 1995.

Thorisson, K.R., in Simulated Perceptual Grouping: An Application to Human–Computer Interaction, Proceedings of the Sixteenth annual Conference of the Cognitive Science Society, Atlanta, GA, USA, Aug. 13–16, 1994, 876–881.

Oviatt, S. and Cohen, P., in Multidomal Interfaces That Process What Comes Naturally, Communications of the ACM, 43(3), Mar. 2000, 45–53.

Streit, M., in *Interaction of Speech, Deixix and Graphical Interface*, Proceeding of the workshop on Deixis, Demonstration and Deictic Belief, held on occasion of Esslli XI, Aug., 1999.

Plamondon, R. and Alimi, A.M., in *Speed/accuracy Tradeoffs In Target–directed Movements*, Behavioral and Brain Sciences 20(2), 1997, 279–349.

Fitts, P.M., in *The Information Capacity of the Human Motor System in Controlling the Amplitude of Movement*, Journal of Experimental Psychology, 47(6), 1954, 381–391.

'Iterative Corrections Model' described by Crossman, E.R.F.W. and Goodeve, P.J., in *Feedback Control of Hand–Movement and Fitts' Law*, Quarterly Journal of Experimental Psychology, 35A, 1963/1983, 251–278.

'Impulse Variability Model', proposed by Schmidt et al., in *Motor Output Variability: A theory for the Accuracy of Rapid Motor Acts*, Psychological Review, 86, 1979, 415–451.

'Optimized Initial Impulse Model' proposed by Meyer et al., in *Optimality in Human Motor Performances: Ideal Control of Rapid Aimed Movements*, Psychological Review, 95, 1988, 340–370.

MacKenzie, I.S., in *Movement Time Prediction in Human–Computer Interfaces*, Readings In Human–Computer Interaction, 2nd edition, Baecker, R.M., Buxton, W.A.S., Gurdin, J. and Greenberg, S., (eds.), Los Altos, CA, USA: Kaufmann, 1995, 483–493.

MacKenzie, I.S. and Buxton, W., in *Extending Fitts' Law to Two–Dimensional Tasks*, Proceedings of the CHI'92 Conference on Human Factors in Computing Systems, New York: ACM, USA, 1992, 219–226.

Taylor, F.V. and Birmingham, H.P., in *The Acceleration Pattern of Quick Manual Corrective responses*, Journal of Experimental Psychology, 38, 1948, 783–795.

Beggs, W.D.A. and Howarth, C.I., in *The Movement of the Hand Towards a Target*, Quarterly Journal of Experimental Psychology, 24, 1972, 448–453.

\* cited by examiner

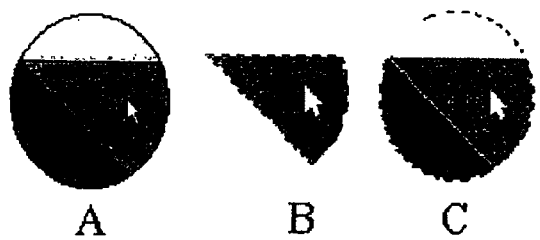
FIG. 1
FIG. 2
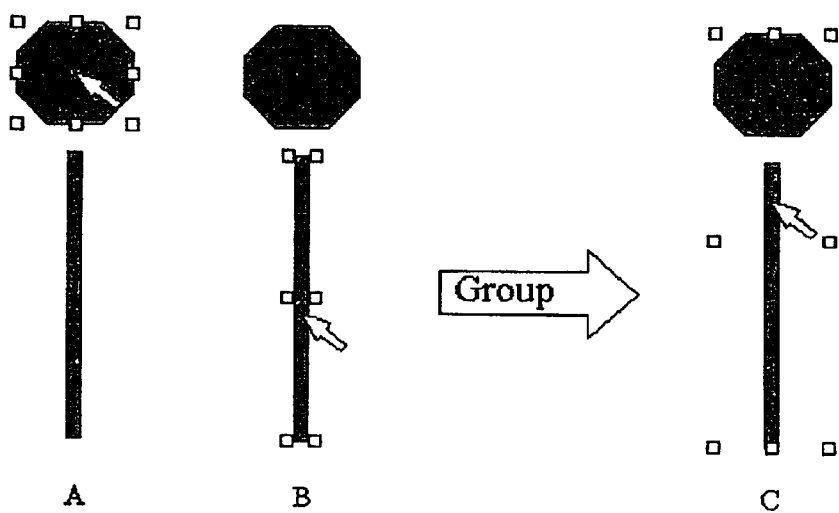
FIG. 3

METHOD AND SYSTEM FOR IMPLICITLY RESOLVING POINTING AMBIGUITIES IN HUMAN-COMPUTER INTERACTION (HCI)

FIELD AND BACKGROUND OF THE INVENTION

The present invention relates to the field of human-computer interaction (HCI) focusing on using a pointer for selecting objects and, more particularly, to a method and system for implicitly resolving pointing ambiguities in human-computer interaction by implicitly analyzing user movements of a pointer toward a user targeted object located in an ambiguous multiple object domain and predicting the user targeted object. Implicitly analyzing the user movements of the pointer and predicting the user targeted object are done by using different categories of heuristic (statically and/or dynamically learned) measures, such as (i) implicit user pointing gesture measures, (ii) application context, and (iii) number of computer suggestions of each best predicted user targeted object.

In the continuously developing field of human-computer interaction (HCI), human-computer interfaces are constantly getting closer to the cognitive level of the user. Contemporary interfaces try to make the human-computer dialogue as natural and non-formal as possible, thus taking advantage of the user's natural perceptual and communicative abilities.

The last decades have witnessed dramatic changes in this respect, with the introduction of new graphical user interface (GUI) concepts and devices such as graphical object manipulation, 'mouse' pointing devices and associated pointers, windows, pull-down dynamic menus, and icons, all of which are now ubiquitous. These concepts were the foundations for the 'WYSIWYG' (what you see is what you get) paradigm originated during the 1970's at Xerox PARC laboratories, and were later used extensively in commercial systems such as the Xerox Star (1981), the Apple Lisa (1982), the Apple Macintosh (1984), and currently in Microsoft Windows. The theoretical principles and psychological foundation of these interfaces were eventually termed 'Direct Manipulation' by Shneiderman, as described by Shneiderman, B., in *The Future of Interactive Systems and The Emergence of Direct Manipulation*, Behavior and Information Technology 1, 1982, 237–256, and reviewed by Myers, B. A., in *Brief History of Human Computer Interaction Technology*, ACM Interactions, 5(2), March 1998, 44–54. The trend of approaching the user's cognitive domain in the field of human-computer interaction has continued since, and is now manifested in the form of the 'Perceptual User Interfaces' paradigm as described by Turk, M. and Robertson, G., in *Perceptual User Interfaces, Communications of the ACM*, March 2000, 43(3), 33–34.

Direct Manipulation (DM) interfaces are characterized by continuous graphic representation of the system objects, physical actions instead of complex syntax, and incremental operations whose impact on the object is immediately visible. DM interfaces are generally shown to improve users' performance and satisfaction, and were cognitively analyzed as encouraging 'Direct Engagement' and reducing 'Semantic Distance', as described by Hutchins et. al., in *Direct Manipulation Interfaces*, User Centered System Design: New Perspectives on Human-computer Interaction, Norman, D. A. and Draper, S. W. (eds.), Lawrence Erlbaum, New Jersey, USA, 1986, 87–124. Direct Engagement refers to the ability of users to operate directly on objects rather than conversing about objects using a computer language.

The 'Cognitive Distance' factor describes the amount of mental effort needed to translate from the cognitive domain of the user to the level required by the user interface, as described by Jacob, R. J. K., in *A Specification Language for Direct Manipulation User Interfaces*, ACM Transactions on Graphics, 5(4), 1986, 283–317. The graphic nature of DM interfaces, with their rich visual representation of the system's objects, exploits the natural perceptual bandwidth of humans. It enables presenting abundant and complex information to be processed simultaneously and naturally by users.

The intuitiveness of DM may also be attributed to the fact that it incorporates natural dialogue elements. For instance, the fact that both user's input and computer's output are performed on the same objects, also referred to as 'inter-referential I/O', is reminiscent of natural language, which often includes references to objects from earlier utterances, as described by Draper, S. W., in *Display Managers as the Basis for User-Machine Communication*, User Centered System Design: New Perspectives on Human-computer Interaction, Norman, D. A. and Draper, S. W. (eds.), Lawrence Erlbaum, NJ, USA, 1986, 339–352.

DM has some limitations, as not all interaction requirements can be reduced to graphical representation. An example of such limitation is the fact that DM is tailored for a demonstrative form of interaction, at the expense of neglecting descriptive interaction, that is, DM is suited for actions such as "delete this", but not for actions such as "delete all red objects that reside next to blue objects". This is a significant limitation of DM, as many human-computer interaction scenarios may benefit from descriptive operations. However, such limitations did not prevent DM from becoming a de facto standard in the last decades, as described by Buxton, B., in *HCI and the Inadequacies of Direct Manipulation Systems*, SIGCHI Bulletin, 25(1), 1993, 21–22.

Despite the dramatic advances of the last decades, user interface is still considered a bottleneck limiting successful interaction between human cognitive abilities and the computer's continually evolving and developing computational abilities. The goal of natural interfaces is being further pursued in contemporary research under the framework of 'Perceptual User Interfaces' (PUI). PUI seek to craft user interfaces that are more natural and compelling by taking advantage of the ways in which people naturally interact with each other. Human-computer interfaces are required, by the PUI paradigm, to be as transparent as possible, and to incorporate several modalities of input and output. Possible input methods include speech, facial expressions, eye movement, manual gestures and touch. Output may be given as a multimedia mix of visual, auditory and tactile feedback, as described in the above Turk and Robertson reference.

While there is consensus that user interfaces should become more 'natural' to the user, different concepts of 'natural interfaces' are being pursued. Many researchers focus on natural language interfaces. The main goal of this discipline is the understanding and deployment of spoken language as a means of entering input. These interfaces are often augmented by additional modalities like physical pointing, as described by Bolt, R. A., in *Put-That-There: Voice and Gesture at the Graphics Interface*, Computer Graphics, 14(3), 1980, 262–270, and described by Kobsa et al., in *Combining Deitic Gestures and Natural Language for Referent Identification*, Proceedings of the 11th International Conference on computational Linguistics, Bonn, West Germany, 1986, 356–361, or lip movement recognition to improve the interface's robustness.

Other researchers try to incorporate natural dialogue principles into non-verbal dialogue. In the above Buxton reference, several drawbacks of using spoken language as a suitable human-computer interface are presented. There, it is claimed that spoken languages are not actually natural (but, rather learned), are not universal (profound differences exist between languages), and are "single-threaded" (only one stream of words can be parsed at a time). Consequently, Buxton's approach is to rely on elements that are arguably more fundamental to natural dialogue such as fluidity, continuity, and phrasing, and integrate them into traditional graphical user interfaces. Similar approaches try to augment traditional GUI, which is said to consist of a syntactic, semantic, and lexical level, as described by Foley, J. D. et al. in Computer Graphics: Principles and Practice, Addison-Wesley, Reading, Mass., USA, 1990, with an additional discourse level. The discourse level refers to the ability of interpreting each user's action in the context of previous actions, rather than as an independent utterance. The interpretation is performed according to human dialogue properties such as conversational flow and focus, as described by Perez, M. A. and Sibert, J. L., in *Focus in Graphical User Interfaces*, Proceedings of the ACM International Workshop on Intelligent User Interfaces, Addison-Wesley/ACM Press, FL, USA, 1993, and by Jacob, R. J. K., in *Natural Dialogue in Modes Other than Natural Language*, Dialogue and Instruction, Reun, R. J., Baker, M., and Reiner, M. (eds.), Springer-Verlang, Berlin, 1995, 289–301.

Another aspect of the cognitive gap between humans and computers is the incompatible object representation. While computer programs usually maintain a rigid definition of their interaction objects, users are often interested in objects that emerge dynamically while working. This disparity is a major obstacle on the way to natural dialogue. The gap can be somewhat bridged using 'Gestalt' Perceptual Grouping principles that may identify emergent perceptual objects that are of interest to the user. Such an effort was made in the "Per Sketch" Perceptually Supported Sketch Editor, as described by Saund, E. and Moran, T. P., in *A Perceptually Supported Sketch Editor*, Proceedings of the ACM Symposium on UI software and Technology, UIST, CA, USA, 1994, and in *Perceptual Organization in an Interactive Sketch Editing Application*, ICCV, 1995.

Perceptual Grouping principles may also be used in order to automatically understand references to multiple objects without the user needing to enumerate each of them. For example, following a user's reference to multiple objects, either with a special mouse action or verbal utterance, a 'Gestalt' based algorithm may be used for identifying the most salient group of objects as the target of the pointing action, as described by Thorisson, K. R., in *Simulated Perceptual Grouping: An Application to Human-Computer Interaction*, Proceedings of the Sixteenth annual Conference of the Cognitive Science Society, Atlanta, Ga., USA, Aug. 13–16, 1994, 876–881.

One profound difference between Perceptual User Interfaces and standard Graphical User Interfaces is that while input to GUIs is atomic and certain, PUIs input is often uncertain and ambiguous and hence its interpretation is probabilistic. This fact presents a challenge of creating robust mechanisms for dealing with uncertainties involved during human-computer interactions. Typically, the strategy of meeting this challenge is by integrating information from several sources, as described by Oviatt, S. and Cohen, P., in *Multidomal Interfaces That Process What Comes Naturally*, Communications of the ACM, 43(3), March, 2000, 45–53.

The present invention for implicitly resolving pointing ambiguities in human-computer interaction, described below, falls within the Perceptual Interface paradigm with respect to both objective and methodology. An important continuously underlying objective of the present invention is to enable transparent human-computer interaction within the Direct Manipulation (DM) paradigm. Methodology of the present invention is based on heuristically dealing with uncertain input, as is often the case with Perceptual Interfaces.

Pointing. A fundamental element of any linguistic interaction is an agreement on the subject to which a sentence refers. Natural conversation is often accompanied by deictic (logic) gestures that help identify the object of interest by showing its location, as described by Streit, M., in *Interaction of Speech, Deixix and Graphical Interface*, Proceeding of the workshop on Deixis, Demonstration and Deictic Belief, held on occasion of Esslli XI, August, 1999. Deictic gestures performed in natural dialogue are very limited in information by themselves, as they only provide a general area of attention. However, these gestures are accurately understood in the conversation context, by integrating information from the spoken language and the gesture.

User interfaces need to incorporate an equivalent mechanism for determining the subject of user operations. DM interfaces implement this conversational element with the concept of the Current Object of Interest (COI), which is the designated object for the next user's actions. Many of the operations available to users of DM are designed to act upon the COI. The common method of designating the COI is by using a deictic gesture to point at the COI, that is, by clicking on the object. A typical interaction scenario consists of selecting the COI by pointing at it, and performing different actions on it, also referred to as the noun-verb or object-action paradigm.

The COI has a unique role in DM interfaces. One of the characteristics of DM interfaces is that they are modeless, whereby, each user's action is interpreted in the same manner, rather than according to a varying application 'mode'. However, the COI mechanism is in fact a way of achieving modes in DM applications, as it reduces the acceptable inputs and determines the way inputs are interpreted, as described in the above Jacob, 1995, reference.

Pointing Ambiguities. Like their natural counterparts, user interface pointing gestures are limited in the information they convey. In scenarios where graphical representations are complex, pointing gestures are typically ambiguous. Simply clicking on the desired object is usually the most intuitive and common selection method. This method of selection is very precise in specifying the exact location of interest, but lacks any other information. In particular, in scenarios featuring complex graphical representations, the exact location information is not sufficient to determine the user targeted object, as several interaction objects may share the same location. In order to overcome this and other types of pointing ambiguities, currently used pointing techniques and mechanisms are extended in various 'explicit' ways, summarized herein below, each of which is at the expense of the desired invisibility of the interface.

Composite Objects Ambiguity. One of the problematic scenarios for target selection is dealing with hierarchical object situations in which some selectable objects are compounds of lower level selectable objects. In such cases, pointing is inherently ambiguous, since several interaction objects share any given pointing device ('mouse') click position. Furthermore, there is no area that is unique to any of the objects, which can serve as an unambiguous selection area. As shown in FIG. 1, a schematic diagram illustrating an example of the commonly occurring composite object type of pointing ambiguity, when a user clicks inside the circle A, the user may want to select either the inner slice B or the entire circle C. This particular type of pointing ambiguity is sometimes referred to as the "pars-pro-toto" ambiguity—mistaking the part for the whole, and vice versa, as described in the above Streit, 1999, reference.

The composite object ambiguity problem exists under the surface of many common human-computer interaction scenarios. For example, in a common word processor, system objects typically consist of letters, words, lines, and paragraphs, each being a possible current object of interest (COI). However, clicking the pointing device (mouse) when the pointer is in the area of a letter can be interpreted as pointing to any of the above system objects. As shown in FIG. 2, a schematic diagram illustrating an example of the commonly occurring composite object type of pointing ambiguity with respect to text objects, when a user clicks inside the area of the letter 'U' indicated by the pointer, the user may want to select the letter 'U', the word 'User', or the entire sentence including the indicated 'U'. Frames shown in FIG. 2 represent the imaginary or potential selection area of each text object.

Currently used pointing techniques and mechanisms use or incorporate different explicit techniques to explicitly overcome or resolve composite object ambiguities. One currently used explicit technique is to 'avoid the hierarchy' by allowing access to only one level of hierarchy at a time. This solution is typical to vector graphics drawing software, whereby users may place graphical elements on a 'canvas' and manipulate them. Objects may be grouped together into a composite object, thus creating an object hierarchy. However, once grouped together, the elemental objects are not accessible unless explicitly ungrouped, in which case the composite object ceases to exist. In terms of the selection mechanism, only one type of object exists, and its selection is very straightforward. In such scenarios, additional, often undesirable, actions of grouping and/or ungrouping need to be performed. Moreover, a related significant limitation of the grouping/ungrouping technique is that the deeper or more extensive the grouping hierarchy becomes, the harder it is for users to select the elemental objects, as more ungrouping actions are required, as well as the need to reconstruct the hierarchy following successful completion of the ungrouping and selecting actions. An example of this approach is the MS WORD drawing objects grouping mechanism, shown in FIG. 3, a schematic diagram illustrating one currently used technique of 'avoiding the hierarchy' for explicitly overcoming or resolving composite object types of ambiguities shown in FIGS. 1 and 2. In FIG. 3, objects A and B are each individual or elemental selectable objects. Once grouped together, objects A and B are part of a single compound or composite object C. A user clicking anywhere within compound object C selects entire object C. The only way of selecting individual or elemental objects A and/or B is by first ungrouping compound or composite object C.

A second currently used explicit technique for overcoming or resolving composite object ambiguities is based on 'having different modes of selection'. This technique enables a user to have direct access to any level of hierarchy, after setting the corresponding selection mode. This explicit technique is only applicable in cases where there is a limited number of hierarchy levels, and, if the hierarchy levels have an a priori meaning to the user. This technique is widely used in CAD applications, where users often need to define and use groups of objects. Again, the meaning of the grouping is that selecting one member of the group results in selecting all members of the entire group. The user may change operation of the selection mechanism properties to be either in a group mode or in a single object mode.

A third currently used explicit technique for overcoming or resolving composite object ambiguities is based on using different procedures or protocols for performing the selection action itself, referred to as 'extended selection' procedures. For instance, MSWord designates a double click action for selecting a word and a triple click action for selecting an entire paragraph. Another extended selection procedure is 'click and drag', whereby a user specifies an area of interest rather then a single point, resulting in either giving more information on a targeted object, or for enabling the user to simultaneously select a plurality of targeted objects.

Two additional currently used explicit types of object selection techniques are 'Pose Matching' and 'Path Tracing', presented as part of the above mentioned "Per Sketch" Perceptually Supported Sketch Editor, which were developed specifically for disambiguating object selection in an environment with rich object interpretations, as described in the above Saund and Moran references. In the Pose Matching technique, a user performs a quick gesture that indicates the approximate location, orientation, and elongation of an intended or targeted object, while in the Path Tracing technique, a user traces an approximate path over the intended or targeted object's curve.

While the above described explicit techniques disambiguate the selection process, each one requires a user to have explicit knowledge of either the particular application modes or the particular selection procedures. Additionally, explicit selection techniques necessarily involve indirect user access to objects, thereby making the human-computer interaction dialogue less conversation like, and undesirably decreases invisibility and/or smoothness of the human-computer interface.

There are other commonly occurring scenarios in the field of human-computer interaction, focusing on object selection and pattern recognition, in which a single click of a pointing device is not enough for users to determine intended or targeted objects. Such scenarios feature one or more of the following types of pointing ambiguities: overlapping of objects, inaccurate pointing due to demanding and/or dynamic conditions such as small targets, moving targets, and a sub-optimal working environment, and, limited pointing devices such as mobile pointing devices, gesture recognition interfaces, and eye-movement interfaces.

To one of ordinary skill in the art, there is thus a need for, and it would be highly advantageous to have a method and system for implicitly resolving pointing ambiguities in human-computer interaction (HCI) by implicitly analyzing user movements of a pointer toward a user targeted object located in an ambiguous multiple object domain and predicting the user targeted object. Moreover, there is a need for such an invention whereby implicitly analyzing the user movements of the pointer and predicting the user targeted object are done by using different categories of heuristic measures, which are widely applicable and extendable to resolving a variety of different types of pointing ambiguities such as composite object types of pointing ambiguities, involving different types of pointing devices besides the commonly used 'mouse' pointing device, and which are widely applicable to essentially any type of software and/or hardware methodology involving using a pointer, in general, and involving object selection, in particular.

SUMMARY OF THE INVENTION

The present invention relates to the field of human-computer interaction (HCI) focusing on using a pointer for selecting objects and, more particularly, to a method and system for implicitly resolving pointing ambiguities in human-computer interaction by implicitly analyzing user movements of a pointer toward a user targeted object located in an ambiguous multiple object domain and predicting the user targeted object. Implicitly analyzing the user movements of the pointer and predicting the user targeted object are done by using different categories of heuristic (statically and/or dynamically learned) measures, such as (i) implicit user pointing gesture measures, (ii) application context, and (iii) number of computer suggestions of each best predicted user targeted object. Particular types of implicit user pointing gesture measures are (1) speed-accuracy tradeoff measures, and (2) exact pointer position measures. Two independent types of speed-accuracy tradeoff heuristic measures primarily used in the present invention are referred to as total movement time (TMT), and, amount of fine tuning (AFT) or tail-length (TL). A particular type of application context heuristic measure used in the present invention is referred to as containment hierarchy.

The present invention successfully overcomes several significant limitations of presently known techniques and methods for resolving pointing ambiguities in human-computer interaction. In particular, the present invention enables implicitly, rather than explicitly, resolving pointing ambiguities, thereby simplifying design and implementation of human-computer interfaces and human-computer interaction protocols, while preserving their transparent or invisible aspects to users. During object selection processes, explicit human-computer interaction operations are eliminated, accordingly, users are not required to learn how to perform different types of explicit operations in order to perform the object selection processes. The present invention provides the additional benefit of involving and encouraging natural 'conversation like' human-computer interaction rather than formal command dictation for using a pointer during object selection in an ambiguous object selection environment. An additional benefit of the present invention is the relatively fast user acquisition of a user intended targeted object in an ambiguous multiple object domain.

The present invention is widely applicable and extendable to resolving a variety of different types of pointing ambiguities such as composite object types of pointing ambiguities, involving different types of pointing devices and mechanisms besides the commonly used 'mouse' pointing device, and which are widely applicable to essentially any type of software and/or hardware methodology involving using a pointer, in general, and involving object selection, in particular. For example, the present invention is readily applicable to resolving pointing ambiguities occurring in object selection methodologies featured in computer aided design (CAD) software, object based graphical editing tools, and text editing.

Implementation of the method and system for implicitly resolving pointing ambiguities in human-computer interaction (HCI), of the present invention, involves performing or completing selected tasks or steps manually, automatically, or a combination thereof. Moreover, according to actual instrumentation and/or equipment used for implementing a particular preferred embodiment of the disclosed method and system, several selected steps of the present invention could be performed by hardware or by software on any operating system of any firmware or a combination thereof. For example, as hardware, selected steps of the invention could be performed by a computer chip or an electronic circuit. As software, selected steps of the invention could be performed by a plurality of software instructions being executed by a computer using any suitable operating system. In any case, selected steps of the present invention could be described as being performed by a data processor, such as a computing platform for executing a plurality of instructions.

BRIEF DESCRIPTION OF THE DRAWINGS

The invention is herein described, by way of example only, with reference to the accompanying drawings, wherein:

FIG. 1 is a schematic diagram illustrating an example of the commonly occurring composite object type of pointing ambiguity;

FIG. 2 is a schematic diagram illustrating an example of the commonly occurring composite object type of pointing ambiguity with respect to text;

FIG. 3 is a schematic diagram illustrating one currently used technique of 'avoiding the hierarchy' for explicitly overcoming or resolving composite object types of ambiguities shown in FIGS. 1 and 2;

DESCRIPTION OF THE PREFERRED EMBODIMENTS

Figure 4:
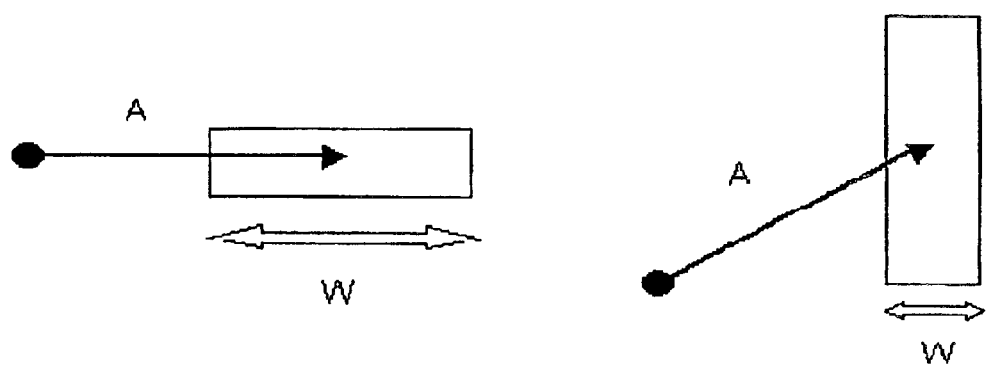
FIG. 4 is a schematic diagram illustrating use of the target (user targeted object) size parameter, W, for applying Fitts' Law to one (left side) and two (right side) dimensional settings, for evaluating the total movement time (TMT) type of speed-accuracy tradeoff heuristic measure, in accordance with the present invention.

The present invention relates to the field of human-computer interaction (HCI) focusing on using a pointer for selecting objects and, more particularly, to a method and system for implicitly resolving pointing ambiguities in human-computer interaction by implicitly analyzing user movements of a pointer toward a user targeted object located in an ambiguous multiple object domain and predicting the user targeted object. Implicitly analyzing the user movements of the pointer and predicting the user targeted object are done by using different categories of heuristic (statically and/or dynamically learned) measures, such as (i) implicit user pointing gesture measures, (ii) application context, and (iii) number of computer suggestions of each best predicted user targeted object. Particular types of implicit user pointing gesture measures are (1) speed-accuracy tradeoff measures, and (2) exact pointer position measures. Two independent types of speed-accuracy tradeoff heuristic measures primarily used in the present invention are referred to as total movement time (TMT), and, amount of fine tuning (AFT) or tail-length (TL). A particular type of application context heuristic measure used in the present invention is referred to as containment hierarchy.

It is to be understood that the invention is not limited in its application to the details of the order or sequence of steps of operation or implementation, or the construction, arrangement, composition, of the components, set forth in the following description, drawings, or examples. For example, the following description refers to the commonly used 'mouse' type of pointing device or mechanism associated with a pointer on a computer display screen, in order to illustrate implementation of the present invention. The invention is capable of other embodiments or of being practiced or carried out in various ways.

Also, it is to be understood that the phraseology and terminology employed herein are for the purpose of description and should not be regarded as limiting. In particular, the description of the present invention refers to the term 'user targeted object' for clearly indicating that an 'object' is 'targeted' by a 'user'. Prior art of the relevant related technology typically refers to this entity simply as the 'target' or 'object' of a 'user' or associated with the intention of a 'user'. Accordingly, throughout the present disclosure, it is to be clearly understood that the presently used term 'user targeted object' is equivalent in meaning and functionality to the commonly used prior art terms of 'target' and 'object'.

Steps, components, operation, and implementation of a method and system for implicitly resolving pointing ambiguities in human-computer interaction by analyzing and predicting user movements of a pointer, according to the present invention, are better understood with reference to the following description and accompanying drawings.

Two preferred embodiments of the method and system for implicitly resolving pointing ambiguities in human-computer interaction are described herein. In the first preferred embodiment of the invention, implicitly resolving the pointing ambiguities implicitly analyzing user movements of a pointer towards a user targeted object located in an ambiguous multiple object domain and predicting the user targeted object are done by using three categories of heuristic measures, that is, (i) implicit user pointing gesture measures, (ii) application context, and (iii) number of computer suggestions of each best predicted user targeted object. In the first preferred embodiment, each sequence of the method includes a step wherein there is suggesting, preferably, by computer visual indication, a best predicted user targeted object to the user, whereby the user either accepts the computer suggested best predicted user targeted object as the user targeted object and as correct, or, rejects the computer suggested best predicted user targeted object as not the user targeted object and as incorrect.

Following each sequence of rejecting the suggested best predicted user targeted object, there is looping back along with feedback of generated heuristic data and information, for as many times as are needed, into the sequence of the method for suggesting another best predicted user targeted object, until the user accepts the suggested best predicted user targeted object as the user targeted object and as correct. Accepting the computer suggested best predicted user targeted object as the user targeted object and as correct is performed by the user performing an acceptance action, for example, 'clicking', using the pointing mechanism, for example, the mouse, with the pointer, indicative that the pointing ambiguities are resolved. In the first preferred embodiment, implicitly analyzing user movements of the pointer toward the user targeted object and suggesting the best predicted user targeted object are done 'before' or 'prior to' the user accepting the suggested best predicted user targeted object as the user targeted object and as correct, for example, by 'clicking' the pointing mechanism. Accordingly, the first preferred embodiment of the present invention is herein also referred to as the 'pre-click suggestion' preferred embodiment.

In the second preferred embodiment of the invention, implicitly analyzing the user movements of the pointer towards a user targeted object located in an ambiguous multiple object domain and predicting the user targeted object are done by using two categories of heuristic measures, that is, (i) implicit user pointing gesture measures, and (ii) application context. In the second preferred embodiment, each sequence of the method includes a step wherein the user selects a pointer position located in a vicinity of the user targeted object, followed by a step wherein the user selects a computer best predicted user targeted object. In this preferred embodiment, the computer selects the best predicted user targeted object which is not suggested to the user for optionally accepting or rejecting, but, rather is either correct or incorrect, at completion of each sequence, thus, accounting for the absence of using the third category of heuristic measures, that is, category (iii) number of computer suggestions of each best predicted user targeted object, which is used in the first preferred embodiment of the invention. In the second preferred embodiment, if the computer generated best predicted user targeted object selected by the computer is not the user targeted object and is incorrect, the user optionally decides to repeat the sequence from anew, for as many times as are needed, whereby, in contrast to the first preferred embodiment, there is no looping back along with feedback of generated heuristic data and information into the sequence of the method, until the user selects the computer best predicted user targeted object as the user targeted object.

In the second preferred embodiment of the invention, the 'selecting action', in the step of selecting, by the user, a pointer position located in the vicinity of the user targeted object, is performed, for example, by the user 'clicking' the pointing mechanism, for example, the mouse, of the pointer located in the vicinity of the user targeted object. In this preferred embodiment, implicitly analyzing user movements of the pointer towards the user targeted object and generating the computer best predicted user targeted object are done 'after' or 'following' the user selecting the pointer position located in the vicinity of the user targeted object, for example, by 'clicking' the pointing mechanism. Accordingly, the second preferred embodiment of the present invention is herein also referred to as the 'post-click prediction' preferred embodiment.

Relevant background and details of the different categories of heuristic (statically and/or dynamically learned) measures, such as (i) implicit user pointing gesture measures, (ii) application context, and (iii) number of computer suggestions of each best predicted user targeted object, used for implicitly analyzing user movements of a pointer towards a user targeted object located in an ambiguous multiple object domain and predicting the user targeted object are provided herein. This description is used for enabling implementation of the above indicated two preferred embodiments of the method and system of the present invention, that is, the first or 'pre-click suggestion' preferred embodiment, and, the second or 'post-click prediction' preferred embodiment, each of which is described in further detail hereinafter.

Implicit User Pointing Gesture Measures. The first category of heuristic (statically and/or dynamically learned) measures for implicitly analyzing the user movements of the pointer and predicting the user targeted object, according to the present invention, is implicit user pointing gesture measures. Particular types of implicit user pointing gesture measures are (1) speed-accuracy tradeoff measures, and (2) exact pointer position measures. Two independent types of speed-accuracy tradeoff heuristic measures primarily used in the present invention are referred to as total movement time (TMT), and, amount of fine tuning (AFT) or tail-length (TL).

Different techniques of gesture-based object selection are currently used in contemporary applications for overcoming the selection ambiguity problem. These techniques require a user to perform special gestures that describe the user targeted object, such as encircling, pose matching, and path tracing as described above. Since all the above techniques require the user to perform a specific gesture describing the user targeted object, they can be referred to as explicit techniques. While these methods successfully disambiguate or resolve ambiguities present in the selection process, they require some knowledge and practice from the user, and thus may be regarded to an extent as non-intuitive.

The present invention is different from the above explicit methods by focusing on the very basic methods of pointing and clicking using a pointing mechanism, such as a computer 'mouse'. Consequently, the present invention resolves pointing ambiguities by using only parameters or measures which are associated with natural pointing gestures. A user is not expected to learn any special selection gesture. In fact, a user may not be aware of the information provided for resolving the pointing ambiguities.

In the present invention, implicitly analyzing user movements of a pointer and predicting a user targeted object located in an object domain, featuring some extent of ambiguity, are done by using, for example, the category of implicit user pointing gesture measures, where, particular types of implicit user pointing gesture measures are (1) speed-accuracy tradeoff measures, and (2) exact pointer position measures. Two independent types of speed-accuracy tradeoff heuristic measures primarily used in the present invention are referred to as total movement time (TMT), and, amount of fine tuning (AFT) or tail-length (TL). These implicit user pointing gesture heuristic measures are related to the speed-accuracy profile of the movement of the pointer and to the exact location of the pointer at the time of selecting a pointer location by using a pointing device or mechanism, such as by clicking on a 'mouse' type of pointing mechanism. It is herein described that these basic physical measures, that are a part of every pointing gesture, contain sufficient information for efficiently resolving pointing ambiguities.

Intuitively, the smaller a user targeted object is, the more time it will take to acquire it. This rule, generally referred to as the Speed-Accuracy tradeoff, as reviewed by Plamondon, R. and Alimi, A. M., in *Speed/accuracy Tradeoffs In Target-directed Movements*, Behavioral and Brain Sciences 20(2), 1997, 279–349, can supply a general scale factor for identifying a particular user targeted object. This scale factor is a very strong disambiguation clue, especially in the scenario of composite object ambiguity, in which possible user targeted object candidates tend to vary significantly in size. Following is a brief description of speed-accuracy tradeoff heuristic measures, followed by a description of two particular types of speed-accuracy tradeoff heuristic measures, total movement time (TMT) associated with the known Fitts' Law, and amount of fine tuning (AFT) or tail-length (TL), both based on different aspects of the speed-accuracy tradeoff, and both uniquely applied for resolving pointing ambiguities, in accordance with the present invention.

Speed-Accuracy Tradeoff Heuristic Measures. The phenomenon of speed-accuracy tradeoff as a measure has been studied in detail starting as early as the late nineteenth century. Empirical experiments conducted by Woodworth, R. S., described by him in *The Accuracy of Voluntary Movement*, Psychological Reviews Monograph Supplements, 3(3), 1899, involved comparing target directed movement in cases where the eyes of subjects were open and closed. Subjects were instructed to perform a directed movement in varying speed limits. Woodworth's main finding was that average spatial errors increase with movement speed in the eyes-open condition, but not in the eyes-closed condition, where the error rate was constantly high. Woodworth's account for the result was that in the eyes-closed condition, the subjects' moves were pre-programmed and guided only by a ballistic 'initial impulse', where as in normal movements represented by the eyes-open condition, the 'initial impulse' phase is followed by a visual feedback correction phase Woodworth named "current control". The faster the movement is, the less effective the visual feedback is, and thus at very high velocities there is a convergence in performance of the eyes-open and eyes-closed conditions.

Total Movement Time (TMT). Woodworth's experiments were followed by extensive work of other researchers, trying to quantify the speed-accuracy tradeoff phenomenon. These efforts resulted in the formulation of Fitts' Law, as described by Fitts, P. M., in *The Information Capacity of the Human Motor System in Controlling the Amplitude of Movement*, Journal of Experimental Psychology, 47(6), 1954, 381–391, stating that the total time it takes to perform a directed movement task is a function of the target (user targeted object) size and distance of the target from a pre-determined reference point. Fitts instructed subjects to move a stylus, or pointer, as fast as possible between two targets (user targeted objects) varying in widths and distances from the pre-determined reference point. Fitts observed that the total time taken to perform the task, herein, referred to as the 'total movement time' (TMT), is a function of the width of the target, W, and its distance, A, from a pre-determined reference point, whereby this phenomenon is described by the formula:

$$\text{Fitts' Law: } TMT = a + b*\log_2[(2*A)/W],$$

where a and b are empirically determined parameters, herein, also referred to as the Fitts' Law parameters, and the asterisk symbol, *, is the multiplication operator. The factor $\log_2[(2*A)/W]$ is termed the index of difficulty, and describes the difficulty to perform a given task in 'bit' units.

Fitts' Law was proven very robust, and was replicated successfully in numerous experiments, covering a wide range of pointing types of movements, experimental conditions and pointing type devices and mechanisms. Several models have been proposed to explain the validity of Fitts' Law. Some of the proposed models, such as the 'Iterative Corrections Model' described by Crossman, E. R. F. W. and Goodeve, P. J., in *Feedback Control of Hand-Movement and Fitts' Law*, Quarterly Journal of Experimental Psychology, 35A, 1963/1983, 251–278, are based on the controlled visual feedback movement phase. Other models, such as the 'Impulse Variability Model', proposed by Schmidt et al., in *Motor Output Variability: A theory for the Accuracy of Rapid Motor Acts*, Psychological Review, 86, 1979, 415–451, are based on the initial impulse of the pointer type movements, while other models, such as the 'Optimized Initial Impulse Model' proposed by Meyer et al., in *Optimality in Human Motor Performances: Ideal Control of Rapid Aimed Movements*, Psychological Review, 95, 1988, 340–370, are hybrids of the two factors of visual feedback movement and initial impulse movement. Yet a different kind of model or theory, the 'Kinematic Theory', proposed by Plamondon, R., in *The Generation of Rapid Human Movements*, Rapport Technique EPM/RT-93-5, cole Polytechnique de Montreal, Feb. 1993, states that the speed-accuracy tradeoff phenomenon is an inherent constraint that emerges from the global neuromuscular system involved in pointing types of movements, as described in the previously cited Plamondon, R. and Alimi, A. M. reference above.

Application of Fitts' Law. The wide acceptance and robustness of Fitts' Law encouraged many human-computer interaction (HCI) researches to adopt it as a tool for analyzing user performance in graphical user interface (GUI) tasks, as reviewed in the previously cited MacKenzie, I. S. reference above. Typically, Fitts' Law is used for predicting the time it takes to perform graphical pointing tasks. In the present invention, the traditional use of Fitts' Law is reversed, and applied as an estimator, not of total movement time (TMT), but rather of the size of a user targeted object given the total movement time (TMT) and distance of the user targeted object from a pre-determined reference point. In other words, instead of looking at a certain user targeted object and estimating the total movement time it takes to acquire it, according to the present invention, there is retrospectively measuring and analyzing the total movement time (TMT) taken for acquiring the user targeted object for drawing conclusions and predictions of the size of the user targeted object.

As a basis for devising the required formula, the present invention uses the Shannon formulation of Fitts' law, which includes a slight variant of the formulation of the index of difficulty factor of Fitts' law, as follows:

$$\text{Shannon formulation: } TMT = a + b*\log_2[(A/W)+1],$$

where the terms A, W, a, and b, are the same as previously defined above according to Fitts' Law.

The Shannon formulation is preferred for implementing the present invention, as it is shown by prior art to have a better fit with observations, and always yields a positive index of difficulty as opposed to the original index of difficulty formulation, $\log_2[(2*A)/W]$, that may sometimes yield negative values, that is, when A<W/2, as described by MacKenzie, I. S., in *Movement Time Prediction in Human-Computer Interfaces*, Readings In Human-Computer Interaction, 2nd edition, Baecker, R. M., Buxton, W. A. S., Gurdin, J. and Greenberg, S., (eds.), Los Altos, Calif., USA: Kaufmann, 1995, 483–493.

For the reversed version of Fitts' Law, that is, the Shannon formulation, there is as input, a measured total movement time, TMT, a known distance of movement, A, and, several candidates of user targeted objects with sizes $W_i$. Given these parameters, the extent by which each candidate user targeted object fits the model, herein referred to as $fit_i$, is written in the following form:

$$fit_i = ABS(TMT - a - b*\log_2[(A/W_i)+1]),$$

whereby, the Fitts' Law empirical parameters, a and b, are preferably computed once, and reflect the properties and characteristics, such as type of pointing device or mechanism, and, computer speed, of the specific human-computer interaction environment or scenario. For better user personalization, Fitts' Law parameters can also be re-computed for each user.

Fitts' original experimental setting instructed subjects to perform one dimensional target (user targeted object) selection. The effective size of the target (user targeted object) was consequently the length of the axis of the target (user targeted object) along the direction of approach by the stylus, or pointer. When extending Fitts' Law to two dimensional settings, a different definition is used for the size, W, of the target (user targeted object), for correctly representing the difficulty of acquiring the target (user targeted object). The definition used in the present invention for the size, W, of the target (user targeted object), is the length of the smaller axis of a box bounding the target (user targeted object), as shown in FIG. 4, a schematic diagram illustrating use of the target (user targeted object) size parameter, W, for applying Fitts' Law to one (left side) and two (right side) dimensional settings, for evaluating the total movement time (TMT) type of speed-accuracy tradeoff heuristic measure. This measure is shown to achieve good fit, and is computationally simple, as indicated by MacKenzie, I. S. and Buxton, W., in *Extending Fitts' Law to Two-Dimensional Tasks*, Proceedings of the CHI'92 Conference on Human Factors in Computing Systems, New York: ACM, USA, 1992, 219–226.

Amount of Fine Tuning (AFT) or Tail Length (TL). Fitts' Law measurements are based on the total movement time (TMT) it takes to perform a task. For implicitly resolving pointing ambiguities, in the present invention, there is introduced a complementary speed-accuracy tradeoff measure that is based on inner properties of the pointer movement profile. The 'tail length' (TL) parameter captures the amount of 'fine tuning' needed for acquiring a target (user targeted object). The relationship between pointer movement tail length and size of the user targeted object, and validity of the relationship as a predictor of user targeted objects was studied.

Pointer movements towards a user targeted object typically consist of an acceleration phase followed by a deceleration phase. Pointer movements requiring only approximate terminal accuracy were shown to have acceleration and deceleration phases with similar lengths, resulting in a symmetric, Gaussian like, velocity profile. However, for pointer movements characterized by a high terminal accuracy, this symmetry breaks down, as the deceleration phase tends to be longer than the acceleration phase, in proportion to the required terminal accuracy, as described by Taylor, F. V. and Birmingham, H. P., in *The Acceleration Pattern of Quick Manual Corrective responses*, Journal of Experimental Psychology, 38, 1948, 783–795, and described by Beggs, W. D. A. and Howarth, C. I., in *The Movement of the Hand Towards a Target*, Quarterly Journal of Experimental Psychology, 24, 1972, 448–453.

Figure 5:
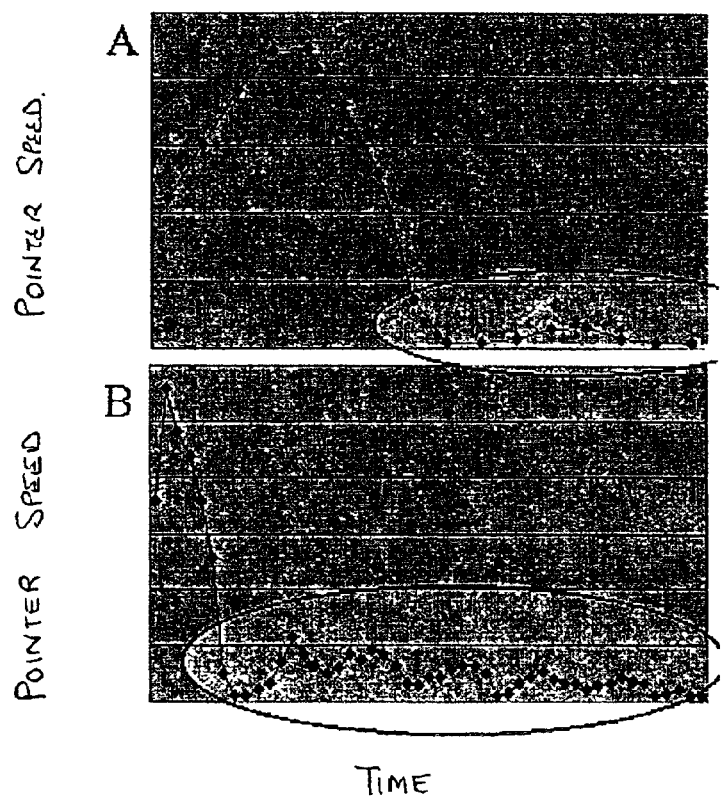
FIG. 5 is a schematic diagram illustrating pointer speed as a function of time, for two typical pointer movements, A and B, where the circled area is the final acquisition stage, the 'movement tail', of the overall pointer movement, relating to the amount of fine tuning (AFT) or tail length (TL) type of speed-accuracy tradeoff heuristic measure, in accordance with the present invention.

The deceleration phase of pointer movements with high terminal accuracy typically ends with an asymptote of practically zero velocity that corresponds to the minute movements before final target (user targeted object) acquisition, or the 'fine tuning' of the pointer movement. The smaller the target (user targeted object) is, the more fine tuning required for acquiring the target (user targeted object). In the present invention, this fine tuning stage is termed the 'movement tail', as shown in FIG. 5, a schematic diagram illustrating pointer speed as a function of time, for two typical pointer movements, A and B, where the circled area is the final acquisition stage, the 'movement tail', of the overall pointer movement, relating to the amount of fine tuning (AFT) or tail length (TL) type of speed-accuracy tradeoff heuristic measure. This type of speed-accuracy tradeoff heuristic measure capturing the length of the 'movement tail' contains additional information relating to the pointer total movement time (TMT) described and evaluated by Fitts' Law. In particular, as can be seen in FIG. 5, the movement tail is characterized by a dramatic decrease in pointer speed, corresponding to a high deceleration value. In the present invention, the dramatic deceleration value is used for identifying the beginning of the fine tuning stage, where the specific threshold value of deceleration is empirically decided upon for each particular application environment.

The amount of fine tuning (AFT) or tail length (TL) type of speed-accuracy tradeoff heuristic measure has several features that make it attractive for applying to methods and systems for resolving pointing ambiguities. Firstly, this heuristic measure is local by nature, and hence computationally simpler than the total movement time (TMT) heuristic measure based on Fitts' Law. Specifically, the information needed for evaluating or computing the (AFT) or (TL) measure resides in the very last phase of the pointer movement, which does not require knowledge of when and where the pointer movement originated. Secondly, the (AFT) or (TL) measure is essentially independent of the Fitts' Law parameters, in that, pointer movements violating the model of total movement time (TMT) as represented by Fitts' Law, may still conform to the end of movement scheme as represented by the (AFT) or (TL) measure.

The local nature of the (AFT) or (TL) measure is especially suitable for real life pointing gestures that are sometimes not really target directed. In particular, real life human-computer interaction (HCI) pointing scenarios are sometimes different from the strict target directed movements of laboratory tests. For example, a user may start the pointer movement in an indecisive manner, in scenarios where the user is not sure of the final user targeted object at the start of the pointing movement gesture. In these scenarios, it can be subjective and quite difficult to identify the time of actual pointer movement start needed for evaluating the Fitts' Law measure of total movement time (TMT) and therefore, the Fitts' Law empirical parameters, a and b.

In contrast, the (AFT) or (TL) measure remains valid, as it is invariant to absolute speed of the pointer, since this measure is based on acceleration rather than speed. This invariance makes the (AFT) or (TL) measure robust when applied to different users, computers, and pointing device or mechanisms, for performing a particular task involving pointer movements, in general, and pointing ambiguities, in particular. However, the value of the acceleration threshold is somewhat dependent on the nature of the particular task, and may need to be empirically adjusted for different kinds of task profiles. More sophisticated movement parsing methods may be employed to extract the tail length of the pointer movement profile. However, the (AFT) or (TL) measure is preferred over more sophisticated pointer movement parsing algorithms because of its computational simplicity, which is important as it is preferably incorporated into computer applications executed extensively during computer runtime.

Given the locality of the amount of fine tuning (AFT) or tail length (TL) type of speed-accuracy tradeoff heuristic measure, it is expected to be highly dependent on the size of a user targeted object, yet largely independent of the distance of the user targeted object from a predetermined reference point. Consequently, the behavior of the (AFT) or (TL) measure is modeled as a function only of the size of the user targeted object. As shown in the following description of an empirical experiment below, the relation between the amount of fine tuning (AFT) or tail length (TL) and size of the user targeted object, W, is well described as a second degree polynomial having the form of:

$$TL = a*W^2 + b*W + c,$$

where a, b, and c, are empirically determined parameters, herein, also referred to as the (AFT) or (TL) parameters, and the asterisk symbol, *, is the multiplication operator. For the size of the user targeted object, W, the same definition proposed by MacKenzie, I. S. and Buxton, W., as described in the previously cited MacKenzie and Buxton reference above, used in the herein above described Shannon formulation of Fitts' Law, that is, the length of the smaller axis of a box bounding the target (user targeted object), as shown in FIG. 4, is also used for the (AFT) or (TL) heuristic measure of the present invention.

Empirical Experiment. An empirical experiment was performed for a first objective of assessing the predictive power of each of the two types of speed-accuracy tradeoff heuristic measures, total movement time (TMT), and, amount of fine tuning (AFT) or tail length (TL), used in the present invention, as well as their combined power. A second objective was to test the assumption that the (AFT) or (TL) type of speed-accuracy tradeoff heuristic measure can be modeled as a function of the size of a user targeted object only, indicating its general independence of distance of the user targeted object from a reference point, located in an object domain.

The experiment was performed using a Windows NT computer operating system, with a 17" display monitor set to 600×800 pixel resolution. The computer executed a computer application including a pointing device or mechanism, in particular, a 'mouse', featuring a pointer dynamically moveable throughout an object domain and running inside a 450×630 pixel window. Five persons or subjects manually operated the pointing device or mechanism, the 'mouse', with their preferred hand, where in this experiment all five subjects used their right hand.

Figure 6:
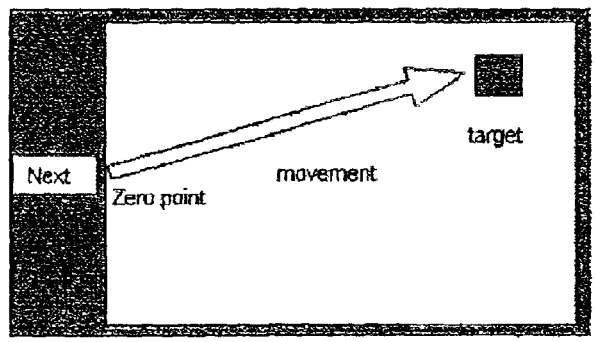
FIG. 6 is a schematic diagram illustrating the experiment layout used for assessing the predictive power of the two types of speed-accuracy tradeoff heuristic measures, total movement time (TMT), and, amount of fine tuning (AFT) or tail length (TL), used in the present invention.

The experimental procedure was as follows. The subjects were instructed to select targets, herein, also referred to as user targeted objects, as fast as they could with the mouse pointing mechanism, that is, each subject placed the cursor or pointer on the target (user targeted object) and pressed the left button of the mouse. The subjects pressed a small "Next" button at the left side of the computer display screen before each next target (user targeted object) was presented for selection by the user. This ensured that all pointer movements initiated at a single pre-determined, fixed or constant reference point in the object domain. FIG. 6 is a schematic diagram illustrating the experiment layout used for assessing the predictive power of the two types of speed-accuracy tradeoff heuristic measures, total movement time (TMT), and, amount of fine tuning (AFT) or tail length (TL), used in the present invention.

All targets (user targeted objects) in the object domain were square-shaped. The manipulated controlled variables were the size, W, of the target (user targeted object), expressed in dimensions of number of pixels, in particular, 12, 25, 50, 100, and 200, pixels, as the length of the smaller axis of a box bounding the target (user targeted object), and, the horizontal distance, A, also expressed in dimensions of number of pixels, in particular, 200, and 350 pixels, from the target (user targeted object) to a pre-determined reference starting point in the object domain. The vertical position of the targets (user targeted objects) was distributed randomly along the vertical axis of the screen to avoid automatic pointer movement. The order of target (user targeted object) appearance was random with each given target (user targeted object) size and horizontal location. Target (user targeted object) selection was repeated 15 times for each subject, amounting to a total of 150 separate times or events of a series of pointer movements, for 2 different target (user targeted object) locations, for 5 different target (user targeted object) sizes, translating to a total of 150 target (user targeted object) selections. The dependant variables were the total movement time (TMT) for the Fitts' Law measure, and length of the pointer movement tail (TL) for the amount of fine tuning (AFT) or tail length (TL) measure.

The dependant variables were computed as follows. The location of the pointer position in the object domain was sampled at constant time intervals during each pointer movement. A vector of the Pythagorean distances between each two consecutive samples was computed, to represent the pointer movement profile. Since absolute measurement units were not relevant for analyzing and understanding the results of this experiment, the computed distance vector was in fact regarded as a speed vector, without dividing it with the constant time interval of sample frequency.

Figure 7:
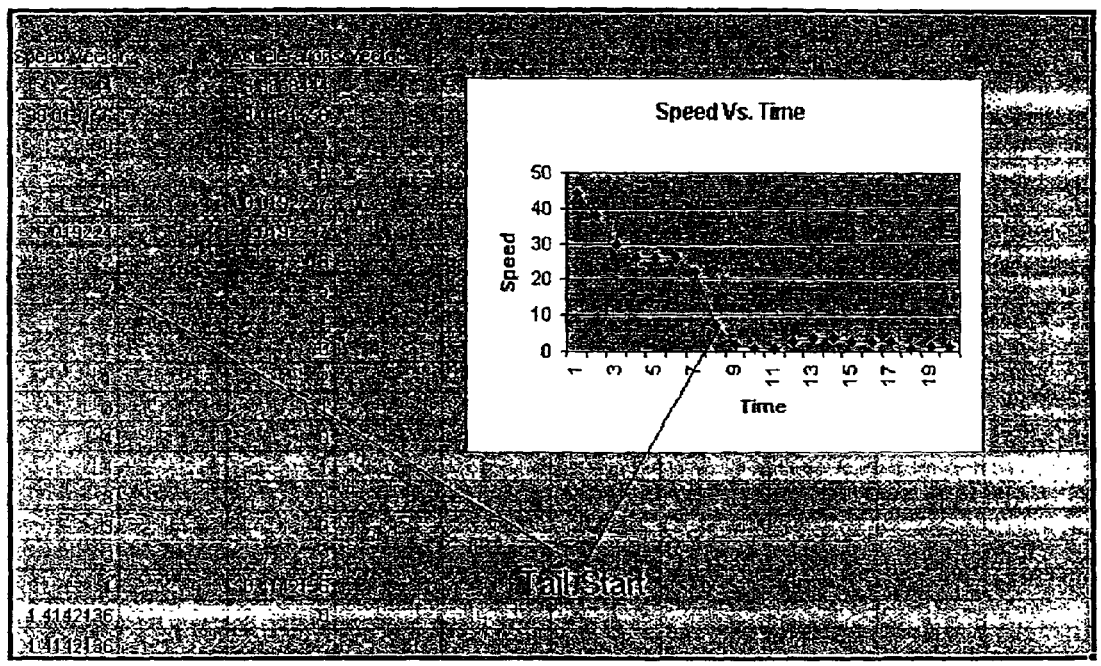
FIG. 7 is a schematic diagram illustrating computation of the tail length (TL), relating to the amount of fine tuning (AFT) or tail length (TL) type of speed-accuracy tradeoff heuristic measure, in accordance with the present invention.

The total movement time (TMT) was represented simply as the number of pointer samples during each movement, that is, the length of the speed vector. For the amount of fine tuning (AFT) or tail length (TL) measure, an acceleration vector was computed, containing the differences between each two consecutive entries in the speed vector. The length of the tail was defined as the number of sample points in which acceleration was below 10 pixels per sample point, counting back from the end of the acceleration vector. This computation captured the notion of the fine tuning stage of the pointer movement previously described above, as shown in FIG. 7, a schematic diagram illustrating computation of the tail length (TL), relating to the amount of fine tuning (AFT) or tail length (TL) type of speed-accuracy tradeoff heuristic measure. The value of 10 pixels per sample point was extracted empirically prior to the experiment, by examining acceleration profiles of target directed movement during similar conditions. The resulting data was analyzed with no outlier removal. Out of the 150 independent times or events of a series of pointer movements measured for each subject, 100 were used for developing a prediction model, while the remaining 50 were used for assessing the prediction power of the model.

For each size, W, of the target (user targeted object), and horizontal distance, A, from the target (user targeted object) to the predetermined reference starting point in the object domain, for 5*2=10 sampling categories, the average values of the measures were computed for each subject, that is, resulting in 10 average category values for each subject. For each subject, linear regression was used to determine the relation between the empirical data (average category values) and each of the measures.

Figure 8:
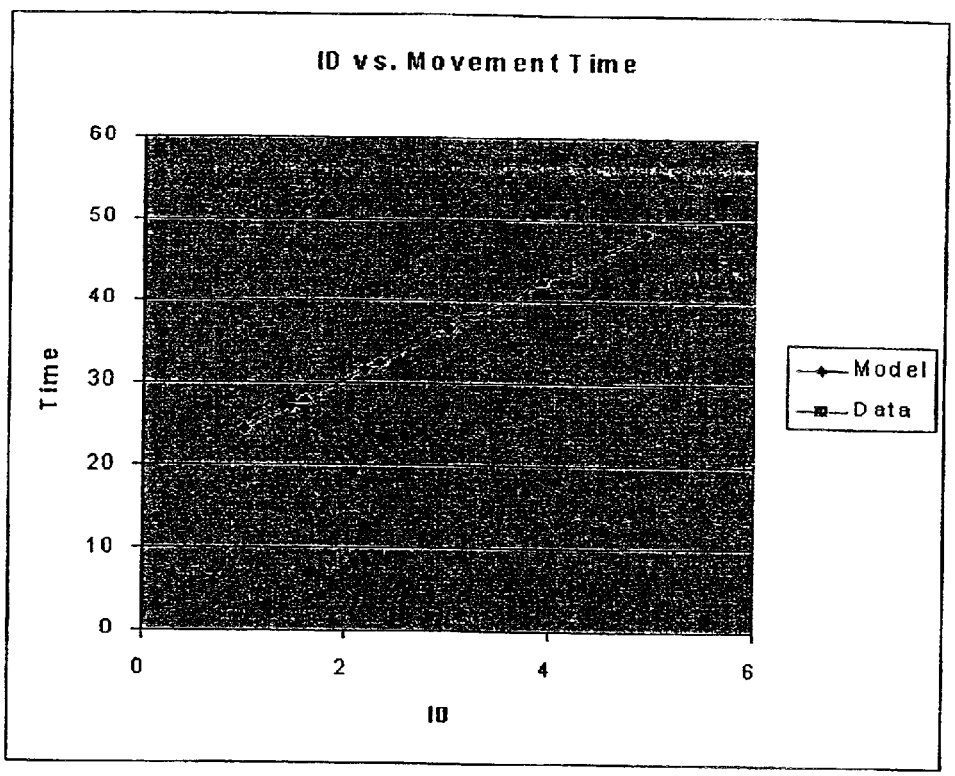
FIG. 8 is a graph of experimental data and model prediction, using the Shannon formulation of Fitts' Law measure, of total movement time, TMT, plotted as a function of the index of difficulty, $ID=\log_2[(A/W)+1]$.

In the case of applying the Shannon formulation of Fitts' Law measure, the regression was done between parameters y=TMT, and x=$\log_2[(A/W)+1]$, resulting in evaluation of the Fitts' Law empirical parameters a and b from the above described Shannon formulation of Fitts' Law formula:

$$TMT = a + b * \log_2[(A/W)+1],$$

where A is the horizontal distance from the target (user targeted object) to the predetermined reference starting point in the object domain, and W is the size of the target (user targeted object) expressed as the length of the smaller axis of a box bounding the target (user targeted object). Experimental data and model prediction using the Shannon formulation of Fitts' Law measure are graphically shown in FIG. 8, a graph of experimental data and model prediction, using the Shannon formulation of Fitts' Law measure, of total movement time, TMT, plotted as a function of the index of difficulty, ID=$\log_2[(A/W)+1]$.

In the case of applying the amount of fine tuning (AFT) or tail length (TL) measure, the regression was performed between parameters y=TL, x=W, and $x^2=W^2$, resulting in evaluation of the (AFT) or (TL) empirical parameters a, b, and c, from the above described (AFT) or (TL) measure formula:

$$TL = a*W^2 + b*W + c.$$

Figure 9:
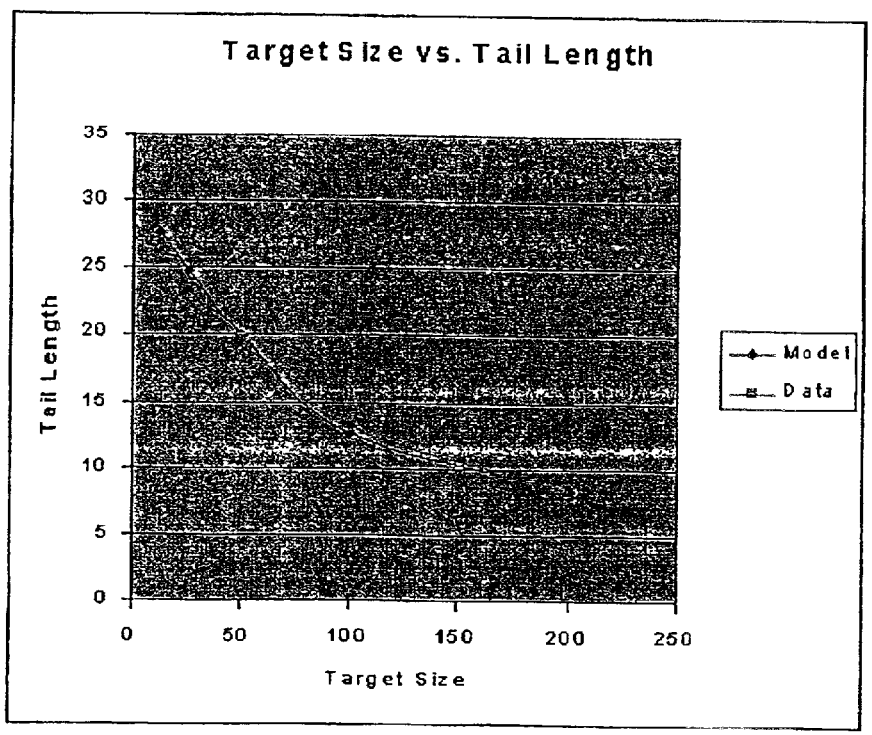
FIG. 9 is a graph of experimental data and model prediction, using the fine tuning (AFT) or tail length (TL) measure, of tail length, TL, plotted as a function of the size of the target (user targeted object), W.

Experimental data and model prediction using the fine tuning (AFT) or tail length (TL) measure are graphically shown in FIG. 9, a graph of experimental data and model prediction, using the fine tuning (AFT) or tail length (TL) measure, of tail length, TL, plotted as a function of the size of the target (user targeted object), W.

Both Fitts' Law (Shannon formulation) and (AFT) or (TL) measures were accurately described by the respective regression models. Two fit to model values, average individual fit and average general fit, of the regression parameter, $r^2$, and standard error, Se (coefficient) for each coefficient or empirical parameter of each speed-accuracy tradeoff measure, that is, a and b, for the Fitts' Law (Shannon formulation) measure, and, a, b, and c, for the (AFT) or (TL) measure, and the parameter, y, for each speed-accuracy tradeoff measure, are presented in the following four tables, two tables for each speed accuracy tradeoff heuristic measure:

Average individual fit—an average of the fit to model levels of each individual subject (Sub).

Average general fit—the fit to model of the averaged data of all five subjects.

Coefficients-Individual Subjects

|        | Sub1 | Sub2 | Sub3 | Sub4 | Sub5 | Average |
|--------|------|------|------|------|------|---------|
| $r^2$  | 0.92 | 0.96 | 0.78 | 0.87 | 0.8  | 0.866   |
| Se (b) | 0.60 | 0.57 | 0.94 | 0.8  | 1.11 | 0.8     |
| Se (a) | 1.8  | 1.7  | 2.86 | 2.42 | 3.67 | 2.49    |
| Se (y) | 2.3  | 2.17 | 2.86 | 3.08 | 4.28 | 2.94    |

$$TMT = a + b * \log_2[(A/W) + 1]$$

Coefficients-Average Data

|        | Average |
|--------|---------|
| $r^2$  | 0.966   |
| Se (b) | 0.4     |
| Se (a) | 1.23    |
| Se (y) | 1.56    |

Coefficients-Individual Subjects

|        | Sub1 | Sub2 | Sub3 | Sub4 | Sub5 | Average |
|--------|------|------|------|------|------|---------|
| $r^2$  | 0.99 | 0.98 | 0.98 | 0.98 | 0.94 | 0.97    |
| Se (a) | 0.00 | 0.00 | 0.00 | 0.00 | 0.00 | 0.00    |
| Se (b) | 0.01 | 0.06 | 0.03 | 0.04 | 0.08 | 0.04    |
| Se (c) | 0.41 | 2.18 | 1.35 | 1.7  | 2.91 | 1.71    |
| Se (y) | 0.4  | 2.1  | 1.3  | 1.64 | 2.8  | 1.65    |

$$TL = a*W^2 + b*W + c$$

Coefficients-Average Data

|        | Average |
|--------|---------|
| $r^2$  | 0.988   |
| Se (a) | 0.00    |
| Se (b) | 0.036   |
| Se (c) | 1.3     |
| Se (y) | 1.25    |

The two values of each parameter for each model both indicate the degree by which the speed-accuracy tradeoff heuristic measures are accurately described using the respective formula. As seen in the tables, with the Fitts' Law (Shannon formulation) measure, the average individual fit to model is $r^2=0.866$, and the fit for the average data is $r^2=0.9660$. With the (AFT) or (TL) measure, the average individual fit to model was $r^2=0.97$, and the fit for the average data was $r^2=0.988$. It is noted that the (AFT) or (TL) measure fit is significantly higher than the Fitts' Law (Shannon formulation) measure fit.

Predictive Power. The high fit to model value of the two models reflect that the averaged data is very well represented with the derived models, even for each individual subject. However, this accurate representation does not ensure good prediction rates, as high variance in the data might make model prediction ineffective. As prediction rate is the ultimate goal of using the speed-accuracy tradeoff heuristic measures, this issue was confronted directly, by using the regression curve computed from 100 pointer movements of each subject, as a model for predicting the size of the target (user targeted object) of the remaining 50 pointer movements for that subject. The prediction test was performed on 4 ambiguous target (user targeted object) combinations: [target 1 vs. target 5], [target 1 vs. target 3], [target 1 vs. target 2], and [target 1 vs. target 3 vs. target 5], where target 1 is the smallest target and target 5 is the biggest target. For instance, in the [target 1 vs. target 5] condition, the prediction test was performed as follows: from the 50 independent pointer movements that were not included in the regression model, there was extracting pointer movements that were towards either target 1 or towards target 5. Then, a scoring method, described in detail below in the implementation guidelines section, was used for predicting whether the pointer movement was towards target 1 or towards target 5. The prediction was then verified using the knowledge of the real target (user targeted object).

Three different prediction settings were used:

1—Shannon formulation of Fitts' Law speed-accuracy tradeoff measure.

2—Amount of fine tuning (AFT) or tail length (TL) speed-accuracy tradeoff measure.

3—Combined measure of both 1 and 2.

In the combined measure setting, a simple voting was conducted between the scores of the two separate measures 1 and 2, knowing that the scores of both measures were normalized, and assuming that the two measures are equally trustworthy.

The results of these tests are summarized in the following tables of 'Hit Rates'. It is noted that the Tail Length measure yielded, on average, better results in all prediction categories. It is also noted that, in general, the combined measure of both Fitts' Law and Tail Length yielded better results than each of the two measures did separately, indicating effective integration of the two speed-accuracy tradeoff heuristic measures for predicting a user targeted object in the object domain presented to each user or subject.

Fitts Hit Rates (in percents)

|             | Sub1  | Sub2  | Sub3  | Sub4 | Sub5 | Average |
|-------------|-------|-------|-------|------|------|---------|
| 1 Vs 5      | 85    | 85    | 90    | 85   | 85   | 86      |
| 1 Vs 3      | 55    | 85    | 75    | 70   | 70   | 71      |
| 1 Vs 2      | 65    | 60    | 70    | 60   | 55   | 62      |
| 1 Vs 3 Vs. 5| 50    | 63.33 | 66.66 | 70   | 60   | 62      |

Tail Hit Rates (in percents)

|             | Sub1  | Sub2  | Sub3  | Sub4  | Sub5  | Average |
|-------------|-------|-------|-------|-------|-------|---------|
| 1 Vs 5      | 80    | 80    | 90    | 100   | 95    | 89      |
| 1 Vs 3      | 65    | 75    | 70    | 75    | 80    | 73      |
| 1 Vs 2      | 60    | 65    | 60    | 70    | 65    | 64      |
| 1 Vs 3 Vs. 5| 56.66 | 73.33 | 76.66 | 76.66 | 66.66 | 69.994  |

Joint Tail and Fitts Hit Rates (in percents)

|  | Sub1 | Sub2 | Sub3 | Sub4 | Sub5 | Average |
|---|---|---|---|---|---|---|
| 1 Vs 5 | 85 | 85 | 90 | 100 | 95 | 91 |
| 1 Vs 3 | 65 | 70 | 70 | 70 | 70 | 69 |
| 1 Vs 2 | 65 | 60 | 65 | 75 | 60 | 65 |
| 1 Vs 3 Vs. 5 | 56.66 | 66.66 | 73.33 | 83.33 | 76.66 | 71.33 |

Figure 10:
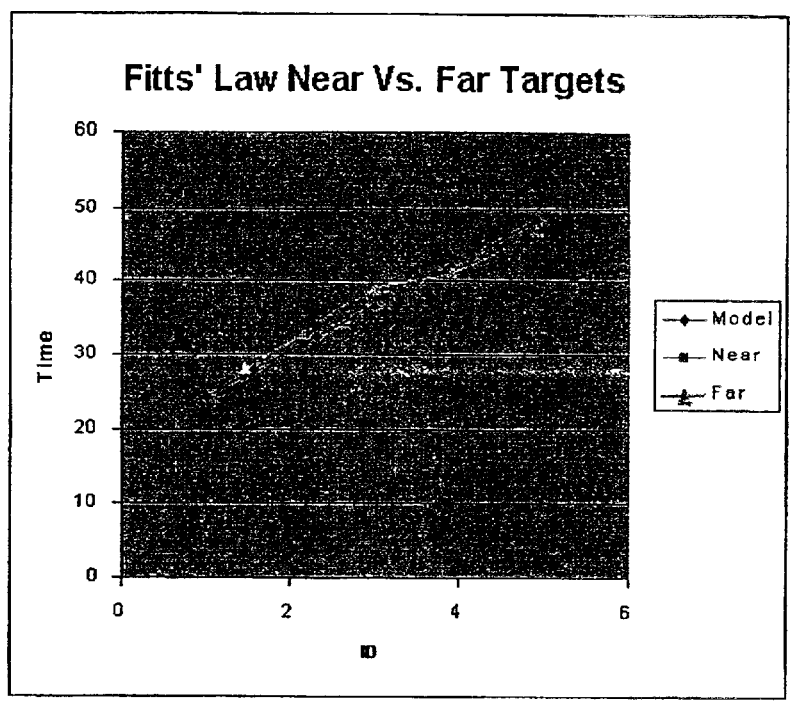
FIG. 10 is a graph of experimental data and Shannon formulation of Fitts' Law heuristic measure model prediction of total movement time, TMT, plotted as a function of the index of difficulty, $ID=\log_2[(A/W)+1]$, for Near vs. Far Targets.
Figure 11:
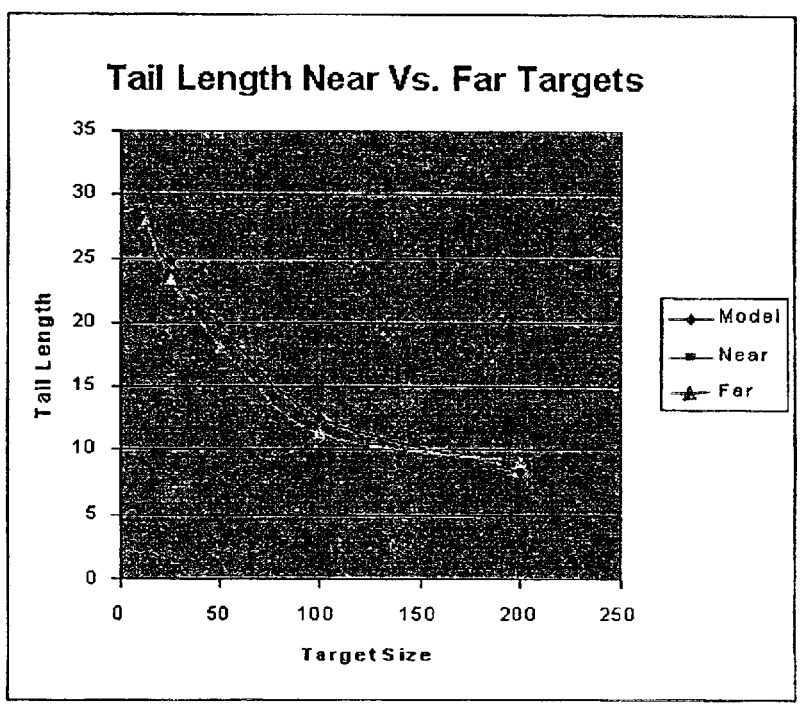
FIG. 11 is a graph of experimental data and (AFT) or (TL) heuristic measure model prediction of tail length, TL, plotted as a function of the size of the target (user targeted object), W, for Near vs. Far Targets.

Near Versus Far Analysis. The above data of the empirical experiment were further analyzed by separating the results of the closer (Near) targets (user targeted objects) from the results of the farther (Far) targets (user targeted objects). This process was done for each subject as well as for a cross-subject average. The results are graphically shown in FIG. 10, a graph of experimental data and Shannon formulation of Fitts' Law heuristic measure model prediction of total movement time, TMT, plotted as a function of the index of difficulty, $ID=\log_2[(A/W)+1]$, for Near vs. Far Targets, and, in FIG. 11, a graph of experimental data and (AFT) or (TL) heuristic measure model prediction of tail length, TL, plotted as a function of the size of the target (user targeted object), W, for Near vs. Far Targets.

The cross-subject average analysis revealed that while the near vs. far conditions appear balanced for Fitts' Law (Shannon formulation) measure they demonstrate a slight bias for the Tail Length measure, that is, the tail tends to be longer for closer targets (user targeted objects). This bias indicates that the (AFT) or (TL) speed-accuracy tradeoff heuristic measure is not completely invariant to the horizontal distance, A, from the target (user targeted object) to the pre-determined reference starting point in the object domain, and that a more accurate prediction model may be derived by integrating this factor into the computation.

Exact Pointer Position Heuristic Measures. In most human-computer interaction (HCI) environments, a user targeted object is explicitly selected, by a user, by locating the pointer position and performing an explicit selection action using a pointing mechanism, for example, by clicking on a 'mouse' type of pointing mechanism anywhere on the user targeted object, regardless of the exact location of the pointer position within the user targeted object. Other human-computer interaction environments feature special explicit interaction areas within the user targeted object, typically, edges, or designated 'handles' associated with the user targeted object, for explicitly enabling activation of special operations on the user targeted object. In the later case, the special interaction areas are allocated in advance and have a unique role, and thus function as independent human-computer interaction user targeted objects. In typical computer applications including a pointer, or a cursor, dynamically moveable throughout an object domain, a user placing the pointer, or cursor, on any of these special interaction areas usually invokes a visual feedback, typically, a change in shape of the pointer, or cursor, to ensure the unique interpretation of the input of the pointer, or cursor, movement by the user.

In contrast to these explicit and deterministic types of human-computer interaction, the present invention includes the use of a second particular type of the above described category of implicit user pointing gesture measures, which is herein referred to as exact pointer position heuristic measures. The exact pointer position is used in an implicit and probabilistic manner, while integrating this information with the other types of heuristic measures, such as the previously described Fitts' Law (Shannon formulation) and (AFT) or (TL) types of speed-accuracy tradeoff heuristic measures, as well as with the other two categories of heuristic measures, that is, application context heuristic measures, and, number of computer suggestions of each best predicted user targeted object heuristic measures.

The exact pointer position heuristic measure conveys information both with regard to the final position of the pointer and with regard to the recent user movement continuation, also referred to as user movement trend, of the pointer towards a user targeted object in an ambiguous multiple object domain. Specifically, the present invention features two kinds of exact pointer position heuristic measures, as follows:

1—Distance from the center of an object. The closer the pointer position is to the center of an object in an ambiguous multiple object domain, the more likely that object is the user targeted object in the multiple object domain. In order to avoid a bias for small objects in the ambiguous multiple object domain, the proximity of the pointer position to the center of an object is normalized with the area of the object.

2—Direction of pointer movement. Higher scores are assigned to pointer movements that are towards the center of an object in an ambiguous multiple object domain, than to those pointer movements that tend to be farther away from the center of an object. This reflects the observation that users tend to perform the object selection action using the pointing mechanism, for example, clicking the mouse, with the pointer position close to, but not beyond, the center of an object, but tend not to overshoot when performing the selection action, for example, clicking the mouse, with the pointer position located beyond the center of an object. Another justification for a penalty for getting away from, or beyond, the center of an object, is that the user already had an opportunity to perform the object selection action using the pointing mechanism, for example, clicking the mouse, with the pointer position more centrally located in the immediate vicinity of the object, and is thus less likely to select the pointer position located beyond the center of the object compared to pointer positions located close to, and not beyond, the center of the object.

Application Context Heuristic Measures. The second category of different heuristic (statically and/or dynamically learned) measures for implicitly analyzing the user movements of the pointer and predicting the user targeted object, according to the present invention, is application context heuristic measures. A particular type of application context heuristic measure used in the present invention is referred to as containment hierarchy.

The context of the selection action of a user is defined as any information that is external to the object selection action itself, but is relevant to understanding the object selection action. In contrast to the nature of pointer movement measures and parameters, the parameters of application context measures are more application, environment, or scenario, specific. Each particular application, environment, or scenario, involves different assumptions regarding the current context of the object selection action of a user, according to the inner logic of the application, environment, or scenario.

One example of context disambiguation is the T9 (text on 9 keys) algorithm for entering text, as described by Grover et al. in U.S. Pat. No. 5,818,437, "Reduced Keyboard Disambiguating Computer", which is incorporated into contemporary mobile telephone devices. In a standard phone keypad, each numerical key (2–9) is assigned several letters, and thus an inherent ambiguity exists when typing text. The common solution for overcoming or resolving this ambiguity is having a user press each key once for the first letter designated by the key, two times for the second letter, and three times for the third letter. For example, in such a T9 keypad, typing the word 'how' requires a user to type the sequence 44,666,9. This solution is problematic since it requires many keystrokes, and additionally requires a pause between each pressing two numbers. Without a pause, the sequence 22228, for instance, is ambiguous and can be parsed in several manners, such as 2,222,8 meaning "act", and, 222,2,8 meaning "cat". The T9 algorithm enables entering text using one key press per letter.

Given a sequence of several keystrokes that represents a word, the T9 algorithm reviews the possible words that the sequence may represent, and disambiguates it using a database of most commonly used words. Each keystroke is thus interpreted in the context of the other keystrokes. It is noted that in the above example, both "cat" and "act" may be plausible interpretations of the same sequence 2,2,8, and thus, the disambiguation is not be complete in this scenario. Different word databases can be used for different applicative content domains. For instance, in the MP3 player device of Memory Corporation, USA, implementation of the T9 algorithm features a special database with names of song titles, album titles, and names of artists.

The present domain of object selection by pointing contains a large amount of information that is useful for evaluating application context heuristic measures. For instance, combined speech and gesture interfaces employ vocal information to better interpret pointing gestures, as described in the previously cited Bolt reference above. Another application context heuristic measure is of the recent selections of a user. In many cases, a user selecting one user targeted object suggests the next user targeted object to be selected by the user. More complex application context heuristic measures may be devised based on identifying patterns in the set of the last selections by the user of a user targeted object. For example, all recently selected user targeted objects have identical attributes, and assume the user will select the next user targeted object according to the identified pattern.

The above described rules for application context heuristic measures are known a priori, and reflect some explicit inner logic of the particular application, environment, or scenario. A different kind of application context is statistical context, in which the next selection action by a user is predicted according to statistical data gathered empirically. For instance, an application context heuristic measure may keep record of the most common selection action a user performs at a certain situation, and makes this action readily available to other users. Due to the application specific nature of application context heuristic measures, it is difficult to demonstrate it in a general simulation environment that does not contain any real application logic. In the example of a simulated human-computer interaction (HCI) environment, presented below following description of the method and system of the present invention, application context heuristic measures are exemplified by using a relatively general definition of 'perceptual context', which in the presented example, is referred to as containment hierarchy.

Number of Computer Suggestions of Each Predicted User Targeted Object Heuristic Measures. The third category of different heuristic (statically and/or dynamically learned) measures for implicitly analyzing the user movements of the pointer and predicting the user targeted object, according to the present invention, is number of computer suggestions of each best predicted user targeted object heuristic measures.

The number of suggestions of each best predicted user targeted object heuristic is a general, practical heuristic measure that is meant to balance the other two previously described categories of heuristic measures presented above. This type of heuristic measure is based on the notion that the more times a best predicted user targeted object is suggested by a computer to a user within a single selection process, the less likely the best predicted user targeted object is the actual or correct user targeted object. This heuristic measure is implemented by counting the number of times a best predicted user targeted object is suggested, by the computer to the user, during each user selection action associated with the user pointer movements, and proportionally decreasing the score of that best predicted user targeted object. The count is reset after a selection action is performed by the user using the pointing mechanism, for example, by the user clicking on a mouse.

The number of suggestions of each best predicted user targeted object heuristic measure prevents the human-computer interaction (HCI) environment from 'insisting' on suggestions by the computer, therefore, resulting in providing flexibility in user behavior during the pointing movements and selection process. This heuristic measure also enhances the extent to which the human-computer interaction is perceived as a human-computer dialogue rather than a unilateral commanding scenario by the computer.

Implementation Guidelines. Guidelines are herein presented with respect to using the previously described three different categories and particular types of heuristic measures for implementing the present invention.

With respect to using the Fitts' Law heuristic measure, in general, and the Shannon formulation of the Fitts' Law heuristic measure, in particular, since this speed-accuracy tradeoff heuristic measure for implicitly resolving pointing ambiguities in human-computer interaction is based on the time it takes to perform a selection task, one implementation guideline is that of determining the start of the pointer movement. This guideline needs to be carefully used, as normal pointer movements often consist of several sub-pointer movements, whereby, there is the risk of falsely identifying the start of the pointer movement. On the other hand, failing to identify the real start of pointer movement may also make the model ineffective. For implementing the present invention, a predetermined period of pointer idleness, preferably, on the order of one second, is used as an indication of the end of pointer movement. Accordingly, pointer movement time is defined as the time passed from the last time the pointer is idle to the time at which there is suggesting to the user, or selecting for the user, by the computer, the best predicted user targeted object, generated by the computer.

With respect to using the amount of fine tuning (AFT) or tail length (TL) heuristic measure, this speed-accuracy tradeoff heuristic measure for implicitly resolving pointing ambiguities in human-computer interaction has the attractive feature that its computation is invariant to the start of pointer movement. Its computation is thus simpler than that relating to the Fitts' Law, heuristic measure, in general, and the Shannon formulation of the Fitts' Law heuristic measure, in particular, and includes analyzing the pointer movement acceleration data and identifying an acceleration level higher than the pre-determined threshold level. Another feature of the (AFT) or (TL) heuristic measure, which was revealed by analyzing the results of the below described example of implementing the present invention in a simulated human-computer interaction environment, is that it is quite suitable for explicit use, that is, once users become familiar with moving a pointer in a computer application environment running according to the present invention, users can perform deliberate small pointer movements for a 'zoom-in' effect, and large pointer movements for a 'zoom-out' effect.

Further with respect to implementing the above described Fitts' Law and (AFT) or (TL) particular types of speed-accuracy tradeoff heuristic measures in the category of implicit user pointing gesture measures, there is included a procedure for extracting or evaluating the respective parameters of each particular type of speed-accuracy tradeoff heuristic measure used in a given human-computer interaction application, environment, or scenario. Specifically, there is evaluating the Fitts' Law empirical parameters, a and b, for using the Fitts' Law formula, TMT=a+b*$\log_2$[(2*A)/W], in general, and for using the Shannon formulation of Fitts' Law, TMT=a+b*$\log_2$[(A/W)+1], in particular. Additionally, or alternatively, there is evaluating the (AFT) or (TL) parameters, a, b, and c, for using the amount of fine tuning (AFT) or tail length (TL) formula, TL=a*$W^2$+b*W+c.

The speed-accuracy tradeoff heuristic measure parameters are preferably empirically learned. In the previously described empirical experiment above, these parameters were evaluated using a sample set of one-hundred series of pointer movements towards to user targeted object. In practice, it is not necessary to require each user to undergo such a long training or calibration procedure as it is tedious and not practical in real human-computer interaction applications. Accordingly, speed-accuracy tradeoff heuristic measure parameters are preferably evaluated by a training or calibration procedure using a smaller number of users, even using a single user, and then applying the training or calibration set of speed-accuracy tradeoff parameters as default for all users. As previously described and shown above, referring to FIGS. 8–11 and corresponding tables of fit to model regression parameters, the speed-accuracy tradeoff parameters are sufficiently robust for applying a one time training or calibration set to a plurality of different users.

However, in order to achieve better sensitivity to different users and hardware, an optional training module is included for implementing the present invention, where the training module for evaluating the speed-accuracy tradeoff parameters is preferably custom designed according to the particular human-computer interaction application, environment, or scenario, characterized by pointing ambiguities. In such a training module, users are instructed to select a set of, for example, twenty-five, typical targets (user targeted objects) in a controlled manner. These selections are used for extracting or evaluating the required speed-accuracy tradeoff parameters using linear regression.

A more sophisticated approach is to extract or evaluate the speed-accuracy tradeoff parameters dynamically and transparently during real time interaction between the computer and the user. The baseline for evaluating the speed-accuracy tradeoff parameters in this manner is preferably the set of parameter values evaluated from a limited set of typical users, as described above, while the dynamically evaluated user's specific speed-accuracy tradeoff parameters only serve as minor personal adjustments to the baseline parameter values. For instance, one may use all non-ambiguous pointer movements for continuously updating the dynamically changing pointer movements, without intervention by a user. The advantages of such a procedure are avoiding the additional training or calibration stage, and enabling the computer, that is the computer application executing the present invention, to dynamically learn about a particular user. This later factor can be very relevant for successful implementation of the present invention, since pointer movement profiles of users are likely to change during different familiarity stages of different types of human-computer interaction applications, environments, and scenarios.

With respect to the exact pointer position heuristic measures, this additional type of implicit user pointing gesture measures for implicitly resolving pointing ambiguities in human-computer interaction prefers objects whose center is close to the location of the pointer position, and favors pointer movements towards the center of an object compared to pointer movements away from the center of an object. This type of heuristic measure is valuable in most cases for resolving pointing ambiguities, as it is highly implicit for leading to computer suggestion or prediction of a best predicted user targeted object near its geometric center. However, this heuristic measure may be misleading in cases such as text selection, where objects tend to be long and narrow. For instance, activating the exact pointer position heuristic measure in a text selection type of ambiguous multiple object (text objects such as letters, words, and paragraphs) domain environment will cause letter selection at the beginning and end of words to behave differently than letter selection at the center of words, since pointer positions located at and/or in the direction of letters close to the center of a word are more likely to be interpreted by the computer as selection of the entire word. This would lead to suggesting to the user, or selecting for the user, by the computer, the entire word as the best predicted user targeted object, generated by the computer.

With respect to number of computer suggestions of each best predicted user targeted object heuristic measures, as previously described above, this third category of implicit heuristic measures for implicitly resolving pointing ambiguities in human-computer interaction is a general, practical heuristic measure that is meant to balance the other previously described categories of heuristic measures presented above. This heuristic measure is implemented by counting the number of times a best predicted user targeted object is suggested, by the computer to the user, during each user selection action associated with the user pointer movements, and proportionally decreasing the score of that best predicted user targeted object. The count is reset after a selection action is performed by the user using the pointing mechanism, for example, by the user clicking on a mouse.

Forming a Set of Candidate Predicted User Targeted Objects. There are several different ways for forming, by the computer, a set of candidate predicted user targeted objects, where according to the particular preferred embodiment, that is, the first or second preferred embodiment of the present invention, as herein described above and below, the set is used by a user for implementing the present invention, the set of candidate predicted user targeted objects is used for either suggesting, by the computer to the user, a best predicted user targeted object, according to the first preferred embodiment of the invention, or, is used for selecting by the computer for the user, a best predicted user targeted object, according to the second preferred embodiment of the invention.

The most straightforward way of forming a set of candidate predicted user targeted objects is considering as candidate every object, in the ambiguous multiple object domain, which includes the current location of the pointer position at the time of the user performing a selection action using the pointing device or mechanism, such as by clicking on a mouse device. However, if there is a reason to believe that the user may have difficulties pin-pointing the user targeted object, the set of candidate predicted user targeted objects may be formed of objects in a certain vicinity of the current location of the pointer position. A third approach for forming the set is to consider as candidate predicted user targeted objects, objects in the object domain that are in the general direction of the pointer movement, even if those objects are still far away from the pointer, thus saving a user some pointer movement time. In a way, this approach is the real equivalent for pointing at things or objects, rather than physically touching them. In this case, the distance of the user targeted object from a pre-determined reference point may be integrated into the prediction scheme, and the speed-accuracy tradeoff heuristic measures are then modified to accommodate partial pointer movements.

Scoring. In order to properly combine the analyzing and predicting features of the different categories and particular types of heuristic measures, there is computing a score for each heuristic measure that reflects the level of confidence of the corresponding heuristic measure for each candidate predicted user targeted object in the above described set of candidate predicted user targeted objects. Accordingly, scores computed for the respective heuristic measures are normalized to enable balanced summation or integration.

Implementation of each heuristic measure generates a fit score for each candidate predicted user targeted object. The scores reflect the level of certainty or confidence that each candidate predicted user targeted object is the user targeted object, or is correct. The following scoring procedure is used for implementing the present invention:

Given a set of candidate predicted user targeted objects, herein, also referred to as a set of candidates:

(1) There is measuring the distance between the measured data and the value expected by the model of the particular heuristic measure, for each candidate predicted user targeted object, whereby, Distance (candidate)=$ABS$[MeasuredData−ModelData(candidate)].

(2) There is normalizing the obtained value of each Distance(candidate) by dividing by the highest or max Distance(candidate) value, whereby, NormDistance(candidate)=Distance(candidate)/
Max{(Distance(candidate#1), . . . , Distance(candidate#n)}.

This results in having a value of 1 for the highest Distance (candidate) value and a value between 0 and 1 for the rest of the Distance(candidate) values.

(3) There is reversing the score, so that the highest score will be assigned to the smallest Distance(candidate) value, whereby, Score (candidate)=1−NormDistance (candidate).

Figure 12:
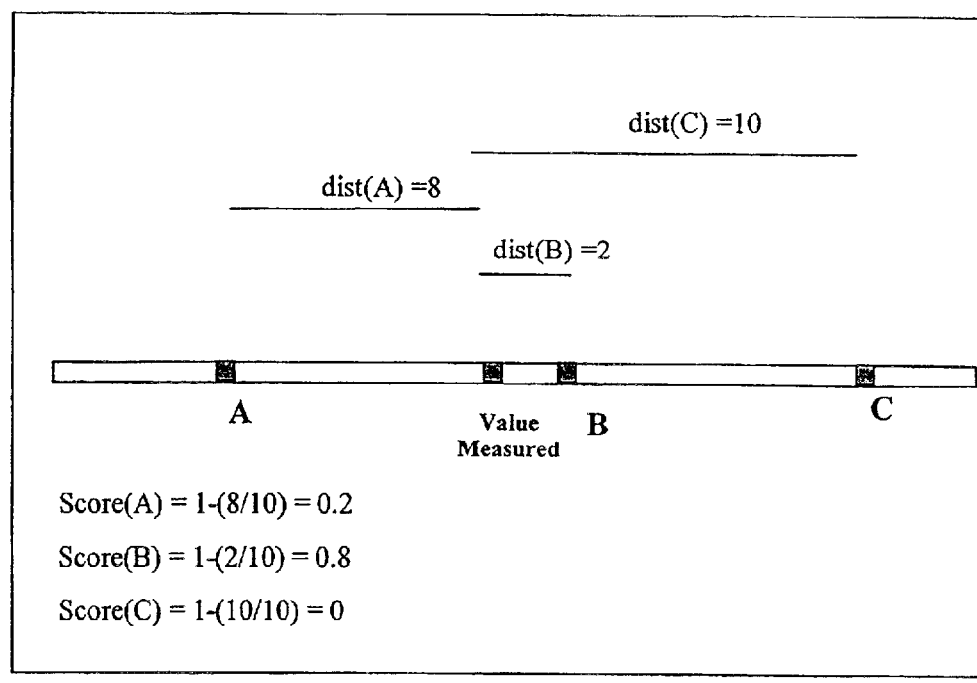
FIG. 12 is a schematic diagram illustrating an exemplary preferred procedure for scoring candidate predicted user targeted objects, predicted by the computer from a set of candidate predicted user targeted objects according to the different categories of heuristic measures, for generating, by the computer, a best predicted user targeted object, in accordance with the present invention.

Note that the final score is always between 0 and 1, where the worst candidate predicted user targeted object is always assigned a normalized score of 0. The score represents the confidence level relative to the given alternative candidates. FIG. 12 is a schematic diagram illustrating an exemplary preferred procedure for scoring candidate predicted user targeted objects, predicted by the computer from a set of candidate predicted user targeted objects according to the different categories of heuristic measures, for generating, by the computer, a best predicted user targeted object, in accordance with the present invention.

Balance Between Heuristics. As described above, the score obtained by implementing each heuristic measure is normalized and reflects the level of certainty or confidence that each candidate predicted user targeted object is the user targeted object, or is correct. This scoring procedure enables keeping all heuristic measures at a generally similar level, and allowing their simple summation or integration. However, different weights may be assigned to each type of heuristic measure in order to achieve a certain balance among them. A particular type of heuristic measure can be assigned a higher weight than the other heuristic measures, if that particular type of heuristic measure is known to be more reliable than the other heuristic measures for implicitly analyzing the user movements of the pointer and predicting the user targeted object. The weighting scheme can be either predetermined or fixed to impose implementation behavior fitted to a specific application, environment, or scenario, or, can be dynamically learned in a heuristic manner, to reflect the characteristics of a specific user.

Selection of a Set of Particular Categories and Types of Heuristic Measures. Different application situations may require different balance among the above described three categories and different particular types of heuristic measures, and, in certain cases, even totally ignoring or disabling one or more particular types of heuristic measures. It is thus possible to devise or customize a pre-determined set of particular categories and types of heuristic measures specifically balanced for optimizing a particular application, environment, or scenario, characterized by pointing ambiguities. Such a devised or customized set of heuristic measures may be automatically determined by the computer according to the instantaneous state of the application, environment, or scenario, or, be explicitly determined by the user.

Prediction Timing. As indicated above, the present invention features two preferred embodiments of a method and corresponding system, for implicitly resolving the pointing ambiguities in human-computer interaction (HCI), that is, the first or 'pre-click suggestion' preferred embodiment, and, the second or 'post-click prediction' preferred embodiment.

In the first preferred embodiment, implicitly analyzing user movements of the pointer toward the user targeted object and suggesting the best predicted user targeted object are done 'before' or 'prior to' the user accepting the suggested best predicted user targeted object as the user targeted object and as correct, for example, by 'clicking' the pointing mechanism. Accordingly, the first preferred embodiment of the present invention is referred to as the 'pre-click suggestion' preferred embodiment.

Following each sequence of rejecting the suggested best predicted user targeted object, there is looping back along with feedback of generated heuristic data and information, for as many times as are needed, into the sequence of the method for suggesting another best predicted user targeted object, until the user accepts the suggested best predicted user targeted object as the user targeted object and as correct. Accepting the computer suggested best predicted user targeted object as the user targeted object and as correct is performed by the user performing an acceptance action, for example, 'clicking', using the pointing mechanism, for example, the mouse, with the pointer, indicative that the pointing ambiguities are resolved.

One feature of the 'pre-click suggestion' preferred embodiment is that implementing it may alter natural pointer movements of the user. The user may try to adjust pointer movement in order to obtain or select the computer suggested best predicted user targeted object, while the computer, on the other hand, responds to the apparent correction efforts of the user. Such human-computer interaction is thus bilateral and conversation like, in contrast to the unilateral selection of the best predicted user targeted object by the computer on behalf of the user, as featured in the second or 'post-click prediction' preferred embodiment of the present invention.

Another feature of first or 'pre-click suggestion' preferred embodiment is that it automatically presents to a user the potentially selectable targeted objects in the ambiguous multiple object domain, for cases where such potentially selectable targeted objects are not visible in the display screen of the computer. Such cases may occur for instance, when a composite object is presented by the computer without a user knowing individual component or elemental objects are contained in the composite object. An opposite example is when several individual component or elemental objects are present without a user knowing the different groupings that are assigned to each one of them.

In the second preferred embodiment of the invention, the 'selecting action', in the step of selecting, by the user, a pointer position located in the vicinity of the user targeted object, is performed, for example, by the user 'clicking' the pointing mechanism, for example, the mouse, of the pointer located in the vicinity of the user targeted object. In this preferred embodiment, implicitly analyzing user movements of the pointer towards the user targeted object and generating the computer best predicted user targeted object are done 'after' or 'following' the user selecting the pointer position located in the vicinity of the user targeted object, for example, by 'clicking' the pointing mechanism. Accordingly, the second preferred embodiment of the present invention is referred to as the 'post-click prediction' preferred embodiment.

The most natural way of predicting the intention of a user for selecting a user targeted object, is after the user completes the pointing gesture and performs the above described selecting action. While this embodiment of the present invention preserves full neutrality of pointing gestures of a user, most applications characterized by pointing ambiguities will not tolerate the error rate of unilaterally selecting by the computer the best predicted user targeted object for the user. Furthermore, once an erroneous best predicted user targeted object is selected by the computer for the user, trying to change or correct the computer selection results in a partial pointing gesture that conveys less information then the initial pointing gesture performed at the start of the method.

The above description is used for enabling implementation of the previously indicated two preferred embodiments of the method and system of the present invention, that is, the first or 'pre-click suggestion' preferred embodiment, and, the second or 'post-click prediction' preferred embodiment, each of which is herein described in detail.

The first or 'pre-click suggestion' preferred embodiment of the method for implicitly resolving pointing ambiguities in human-computer interaction is herein described.

In Step (a) of the first preferred embodiment of the method of the present invention, there is intending, by a user, to select a user targeted object from a plurality of at least two objects in an object domain displayed by a computer executing a computer application including a pointing mechanism featuring a pointer dynamically moveable throughout the object domain.

In Step (b) there is moving, by the user, the pointer towards the user targeted object.

In Step (c) there is estimating, by the computer, user movement continuation, also referred to as user movement trend, of the pointer towards the user targeted object. Estimating by the computer is performed according to a linear regression computation or any other prior art method for estimating pointer movement continuation.

In Step (d) there is forming, by the computer, a set of candidate predicted user targeted objects.

Forming by the computer the set of candidate predicted user targeted objects is performed according to parameters selected from the group consisting of pointer movement continuation parameters of Step (e) and pointer position parameters, and according to one of the previously described procedures above.

In Step (e) there is predicting, by the computer, the user targeted object from the set of candidate predicted user targeted objects of Step (d) according to at least one category of heuristic measures selected from the group consisting of implicit user pointing gesture measures, application context measures, and number of computer suggestions of each predicted user targeted object measures, for generating, by the computer, a best predicted user targeted object.

Implicit user pointing gesture measures used in Step (e) are selected from the group consisting of (1) speed-accuracy tradeoff measures, and (2) exact pointer position measures. Preferably, the above described two independent types of speed-accuracy tradeoff heuristic measures used are total movement time (TMT), and, amount of fine tuning (AFT) or tail-length (TL). An exemplary type of application context heuristic measure used is the above described containment hierarchy.

In sub-step (i) of Step (e) there is evaluating, by the computer, the parameters of the speed-accuracy tradeoff measures. As previously described above, with respect to implementing the above described Fitts' Law and (AFT) or (TL) particular types of speed-accuracy tradeoff heuristic measures in the category of implicit user pointing gesture measures, there is extracting or evaluating the respective parameters of each particular type of speed-accuracy tradeoff heuristic measure used in a given human-computer interaction application, environment, or scenario. Specifically, there is evaluating the Fitts' Law empirical parameters, a and b, for using the Fitts' Law formula, $TMT=a+b*\log_2[(2*A)/W]$, in general, and for using the Shannon formulation of Fitts' Law, $TMT=a+b*\log_2[(A/W)+1]$, in particular. Additionally, or alternatively, there is evaluating the (AFT) or (TL) parameters, a, b, and c, for using the amount of fine tuning (AFT) or tail length (TL) formula, $TL=a*W^2+b*W+c$.

In sub-step (ii) of Step (e) there is scoring, by the computer, each candidate predicted user targeted object of the set of candidate predicted user targeted objects by each of the heuristic measures, for generating, by the computer, a set of scores for each candidate predicted user targeted object. Scoring by the computer is performed according the previously described procedure above.

In sub-step (iii) of Step (e) there is integrating, by the computer, the set of scores of each candidate predicted user targeted object.

Integrating by the computer the set of scores is performed according the previously described procedure above, according to a weighed integration or summation procedure, or, according to any other prior art procedure for integrating or summing a set of scores.

In sub-step (iv) of Step (e) there is identifying, by the computer, the candidate predicted user targeted object having the highest score as the best predicted user targeted object.

In Step (f) there is suggesting, by the computer, the best predicted user targeted object, generated by the computer in Step (e), to the user.

At the time of suggesting, the pointer is initially not located at the computer suggested best predicted user targeted object, but, is optionally, automatically moved by the computer from the vicinity of the user targeted object to the computer suggested best predicted user targeted object.

Just prior to the time of the computer suggesting the best predicted user targeted object according to Step (f), the pointer is located, as a result of Step (b), at a position in a vicinity of the user targeted object. In one particular embodiment of Step (f), at the time of the computer suggesting the best predicted user targeted object, the pointer position is located at another position in the vicinity of the user targeted object, since a finite amount of time is available, for the user to continue moving the pointer towards the user targeted object, from the time of the initial moving of the pointer according to above Step (c), to the time of the computer suggesting the best predicted user targeted object according to current Step (f). In another particular embodiment of Step (f), at the time of the computer suggesting the best predicted user targeted object, the pointer position is automatically moved by the computer to the location of the computer suggested best predicted user targeted object. In Step (f), pointer position or movement is according to user preference and according to pointer position and movement instructions provided to the computer executing the computer application.

In Step (g) there is making a decision by the user selected from the group consisting of accepting the computer suggested best predicted user targeted object as the user targeted object and as correct, and, rejecting the computer suggested best predicted user targeted object as not the user targeted object and as incorrect.

If the decision of the user is for accepting the computer suggested best predicted user targeted object as the user targeted object and as correct, then the user performs an acceptance action, for example, 'clicking', using the pointing mechanism, for example, the mouse, indicative that the pointing ambiguities are resolved.

If the decision of the user is for rejecting the computer suggested best predicted user targeted object as not the user targeted object and as incorrect, then the user continues to use the pointing mechanism for moving the pointer towards the user targeted object, whereby there is repeating Step (b) through Step (g) using previously generated heuristic data and information.

The sequence of repeating Step (b) through Step (g) using previously generated heuristic data and information is performed for as many times as are needed, for suggesting, by the computer, another best predicted user targeted object, until the user accepts the computer suggested best predicted user targeted object as the user targeted object and as correct, and therefore, until the pointing ambiguities are resolved.

The second or 'post-click prediction' preferred embodiment of the method for implicitly resolving pointing ambiguities in human-computer interaction is herein described.

In Step (a) of the second preferred embodiment of the method of the present invention, there is intending, by a user, to select a user targeted object from a plurality of at least two objects in an object domain displayed by a computer executing a computer application including a pointing mechanism featuring a pointer dynamically moveable throughout the object domain.

In Step (b) there is moving, by the user, the pointer towards the user targeted object.

In Step (c) there is selecting, by the user, a position of the pointer located in a vicinity of the user targeted object.

In Step (d) there is estimating, by the computer, user movement continuation, also referred to as user movement trend, of the pointer towards the user targeted object. This step is performed in the same manner as above described Step (c) of the first preferred embodiment of the present invention.

In Step (e) there is forming, by the computer, a set of candidate predicted user targeted objects. This step is performed in the same manner as above described Step (d) of the first preferred embodiment of the present invention.

In Step (f) there is predicting, by the computer, the user targeted object from the set of candidate predicted user targeted objects of Step (e) according to at least one category of heuristic measures selected from the group consisting of implicit user pointing gesture measures and application context measures, for generating, by the computer, a best predicted user targeted object.

Implicit user pointing gesture measures used in Step (f) are selected from the group consisting of (1) speed-accuracy tradeoff measures, and (2) exact pointer position measures. Preferably, the above described two independent types of speed-accuracy tradeoff heuristic measures used are total movement time (TMT), and, amount of fine tuning (AFT) or tail-length (TL). An exemplary type of application context heuristic measure used is the above described containment hierarchy. The following sub-steps of Step (f) are performed in the same manner as previously described sub-steps of Step (e) of the first preferred embodiment of the present invention, and are only briefly indicated here.

In sub-step (i) of Step (f) there is evaluating, by the computer, the parameters of the speed-accuracy tradeoff measures.

In sub-step (ii) of Step (f) there is scoring, by the computer, each candidate predicted user targeted object of the set of candidate predicted user targeted objects by each of the heuristic measures, for generating, by the computer, a set of scores for each candidate predicted user targeted object.

In sub-step (iii) of Step (f) there is integrating, by the computer, the set of scores of each candidate predicted user targeted object.

In sub-step (iv) of Step (f) there is identifying, by the computer, the candidate predicted user targeted object having the highest score as the best predicted user targeted object.

In Step (g) there is selecting, by the computer, the best predicted user targeted object generated by the computer in Step (f), for the user.

In Step (c) above, where there is selecting, by the user, a position of the pointer located in a vicinity of the user targeted object, the user is clearly involved. However, the user is not involved at this stage of Step (g), as the computer is the entity selecting the best predicted user targeted object for the user. This is in contrast to Step (g) of the above described first preferred embodiment of the method.

If the best predicted user targeted object selected by the computer is the user targeted object and is correct, then the pointing ambiguities are resolved.

If the best predicted user targeted object selected by the computer is not the user targeted object and is incorrect, the user optionally decides to repeat the sequence from anew, whereby, there is repeating Step (a) through Step (g). Repeating each sequence of Step (a) through Step (g) from anew is optionally performed for as many times as are needed, for identifying, by the computer, another candidate predicted user targeted object having the highest score as the computer best predicted user targeted object, until the computer selects the best predicted user targeted object as the user targeted object, indicative that the pointing ambiguities are resolved.

Just prior to the time of the computer selecting the best predicted user targeted object according to Step (g), the pointer is located, as a result of Steps (b) and (c), at a position in a vicinity of the user targeted object. In one particular embodiment of Step (g), at the time of the computer selecting the best predicted user targeted object, the pointer position is located at another position in the vicinity of the user targeted object, since a finite amount of time is available, for the user to continue moving the pointer towards the user targeted object, from the time of the initial moving of the pointer according to above Step (b), to the time of the computer selecting the best predicted user targeted object according to current Step (g). In another particular embodiment of Step (g), at the time of the computer selecting the best predicted user targeted object, the pointer position is automatically moved by the computer to the location of the computer selected best predicted user targeted object. In Step (g), pointer position or movement is according to user preference and according to pointer position and movement instructions provided to the computer executing the computer application.

The optional sequence of repeating Step (a) through Step (g) using newly generated heuristic data and information for each sequence is performed for as many times as desired by the user, for identifying, by the computer, another best predicted user targeted object, until the computer selects the best predicted user targeted object as the user targeted object, and therefore, until the pointing ambiguities are resolved.

The first or 'pre-click suggestion' preferred embodiment of the system for implicitly resolving pointing ambiguities in human-computer interaction features the following primary components: (a) a user intending to select a user targeted object from a plurality of at least two objects in an object domain, (b) a pointing mechanism featuring a pointer dynamically moveable throughout the object domain, and controllable by the user, and (c) a computer displaying the plurality of the at least two objects in the object domain and executing a computer application including the pointer dynamically moveable throughout the object domain, whereby the computer implicitly resolves the pointing ambiguities by implicitly analyzing user movements of the pointer towards the user targeted object located in the object domain and predicting the user targeted object, where the implicitly analyzing and predicting are performed by using at least one category of heuristic measures selected from the group consisting of implicit user pointing gesture measures, application context measures, and number of computer suggestions of each predicted user targeted object measures.

The second or 'post-click prediction' preferred embodiment of the system for implicitly resolving pointing ambiguities in human-computer interaction features the following primary components: (a) a user intending to select a user targeted object from a plurality of at least two objects in an object domain, (b) a pointing mechanism featuring a pointer dynamically moveable throughout the object domain, and controllable by the user, and (c) a computer displaying the plurality of the at least two objects in the object domain and executing a computer application including the pointer dynamically moveable throughout the object domain, whereby the computer implicitly resolves the pointing ambiguities by implicitly analyzing user movements of the pointer towards the user targeted object located in the object domain and predicting the user targeted object, where the implicitly analyzing and predicting are performed by using at least one category of heuristic measures selected from the group consisting of implicit user pointing gesture measures and application context measures.

Additional objects, advantages, and novel features of the present invention will become apparent to one ordinarily skilled in the art upon examination of the following example, which together with the above description, illustrates the invention in a non-limiting fashion. Additionally, each of the various embodiments and aspects of the present invention as described herein above and as claimed in the claims section below finds experimental support in the following example.

EXAMPLE

Simulated Human-computer Interaction (HCI) Environment

The simulated human-computer interaction environment features a basic direct manipulation (DM) interface including different user targeted objects in the form of hierarchical shapes, which are selected simply by a user pointing at them, with no other object selection mechanism provided to the user. Implicitly resolving the pointing ambiguities by implicitly analyzing user movements of a pointer towards each user targeted object located in the ambiguous multiple object domain simulated human-computer interaction environment and predicting the user targeted object were done by using the first or 'pre-click suggestion' preferred embodiment of the present invention, including using the three categories of heuristic measures, that is, (i) implicit user pointing gesture measures, (ii) application context, and (iii) number of computer suggestions of each best predicted user targeted object. The particular types of implicit user pointing gesture measures used were (1) speed-accuracy tradeoff measures, and (2) exact pointer position measures. Both types of speed-accuracy tradeoff heuristic measures, total movement time (TMT) according to the Shannon formulation of Fitts' Law, and, amount of fine tuning (AFT) or tail-length (TL), were used, and containment hierarchy was used as the particular type of application context heuristic measure. The five particular types of heuristic measures were chosen to exemplify implementation of the different kinds of heuristic measures described above, while forming together a balanced decision algorithm.

Figure 15:
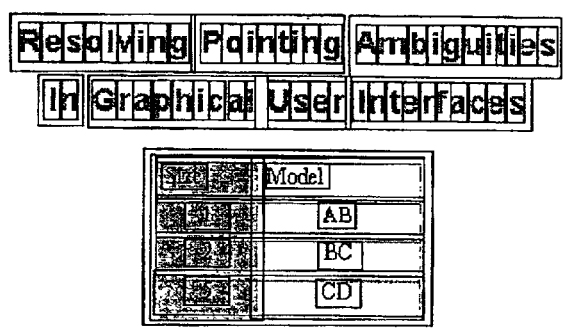
FIG. 15 is a schematic diagram illustrating an exemplary simulation of an ambiguous multiple object domain of text selection.
Figure 16:
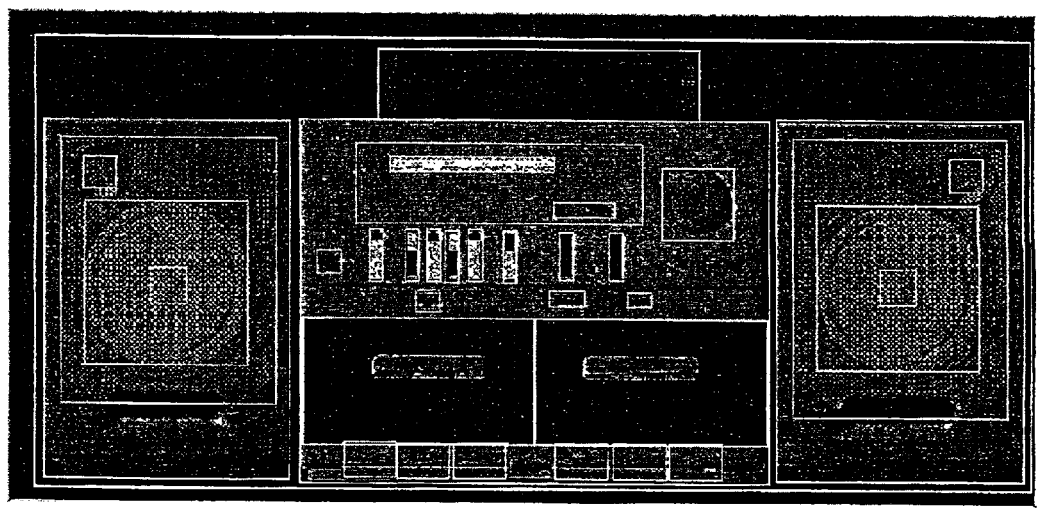
FIG. 16 is a schematic diagram illustrating an exemplary simulation of an ambiguous multiple object domain of a computer aided design (CAD) environment.

The simulated HCI environment included three different ambiguous multiple object domains: (1) an object domain simulating vector graphics selection (FIG. 14), (2) an object domain simulating text selection (FIG. 15), and (3) an object domain simulating a computer aided design (CAD) environment (FIG. 16). Major characteristics of the three object domain simulated HCI environment are detailed below.

The current selection was the user targeted object last chosen by the user. In direct manipulation interfaces this object is usually the target of future action. In this limited simulated human-computer interaction environment, no actions were actually performed on the user targeted objects. However, the current selection has a role in predicting the next selection of the user as described with regard to the containment hierarchy type of application context heuristic measure.

While moving the pointer, the user was constantly being suggested a best predicted user targeted object, in accordance with the first or 'pre-click suggestion' preferred embodiment of the present invention. The candidate predicted user targeted objects were all objects that contained the current position of the pointer. The suggestion dynamically changed to reflect the leading or best candidate predicted user targeted object of the intention by the user. Accepting the computer suggested best predicted user targeted object as the user targeted object and as correct was performed by the user performing an acceptance action, for example, 'clicking', using the pointing mechanism, for example, the mouse, with the pointer, indicative that the pointing ambiguities are resolved.

For the simulated HCI environment, the speed-accuracy tradeoff heuristic measure parameters were evaluated by a training or calibration procedure using a single user, and then were applied as default for all the users. The speed-accuracy tradeoff parameters were sufficiently robust for applying a one time training or calibration set to the different users. During the training or calibration procedure, as described above, users were instructed to select a set of typical user targeted objects in a controlled manner. These selections were used for extracting the required empirical speed-accuracy tradeoff parameters using linear regression. The training procedure consisted of twenty-five selections and resulted in improving the user targeted object prediction rate by the computer.

Figure 13:
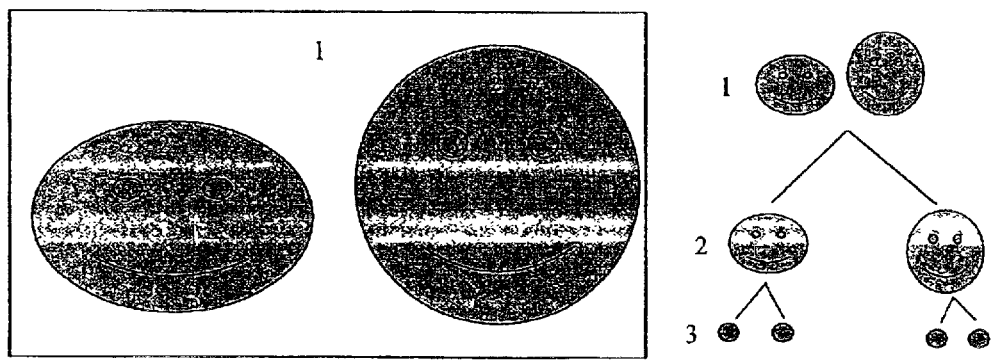
FIG. 13 a schematic diagram illustrating an exemplary containment hierarchy as a particular type of application context heuristic measure.

For implementing the category of application context measures as one of the implicit heuristic measures, a containment hierarchy in the form of a containment tree was constructed for the selectable user targeted objects in the simulated HCI environment, whereby each shape is the father of all shapes that are directly spatially contained in it. The containment level of each user targeted object was defined as its depth in the containment tree, as shown in FIG. 13, a schematic diagram illustrating an exemplary containment hierarchy as a particular type of application context heuristic measure. The containment hierarchy uses the current user targeted object of interest as a source of contextual information. This heuristic measure was based on the ad-hoc assumption that users tend to select sequences of objects at a given level of containment hierarchy. Specifically, in the example illustrated in FIG. 13, it was assumed that the nature of the application was such that once a user selected one of the face user targeted objects the user was more likely to choose another face user targeted object rather than any other user targeted object. This assumption was imposed on the application by the 'tasks' described below.

Similarly, in the domain of text selection, the containment level definition resulted in assigning a different level for letters, words, lines, and paragraphs. Applying the containment hierarchy heuristic measure in this domain was based on the assumption that users tend to make consecutive selections at each of these hierarchy levels.

The simulated human-computer interaction environment presented to the users is an empty environment and does not have a real practical usage scenario. This posed a problem for demonstrating application dependant context heuristics. In order to overcome this difficulty and simulate application context, users were presented with specific selection tasks. The selection tasks were simple textual instructions, directing the users to select certain objects in the ambiguous multiple object simulated environment. The tasks were intended to simulate real user tasks. For the sake of demonstration, it was assumed that 'real' user tasks usually involved selecting objects in a similar containment hierarchy level. Consequently, the tasks directed the users to select different objects with similar hierarchy level, thus imposing application logic on the environment. A corresponding contextual heuristic, in this case, the containment hierarchy heuristic described above, benefited from the nature of the tasks by being assigned higher scores to candidate predicted user targeted objects with hierarchy level similar to the current selection. Naturally no specific knowledge of the tasks was exploited, other than their nature of preserving the hierarchy level.

Scoring was performed as described above, whereby, a fit score was generated for each particular type of heuristic measure for each candidate predicted user targeted object. There was computing a score for each heuristic measure for reflecting the level of confidence of the corresponding heuristic measure for each candidate predicted user targeted object in the a formed set of candidate predicted user targeted objects. The scores computed for the respective heuristic measures were normalized for yielding a balanced summation or integration of all the individual scores.

Figure 14:
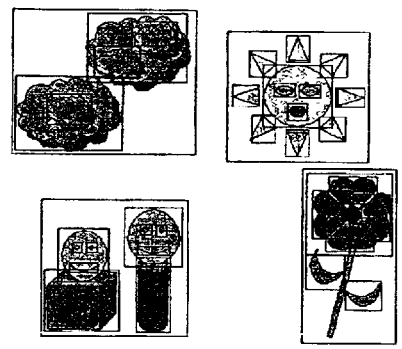
FIG. 14 is a schematic diagram illustrating an exemplary simulation of an ambiguous multiple object domain of object based drawing or graphics software.

Three different kinds of input shapes were used, corresponding to the three distinct domains of human-computer interaction of the simulated environment. The input domains of the environment as well as their decomposition into hierarchical shapes are herein described. In FIGS. 14–16, all selectable user targeted objects are surrounded by rectangles for sake of clarity. These frames were not shown to the users during implementing the present invention in the simulated human-computer interaction environment.

Shapes Domain. Compound graphical shapes were presented simulating the domain of object based drawing software, as shown in FIG. 14, a schematic diagram illustrating an exemplary simulation of an ambiguous multiple object domain of object based drawing or graphics software.

Text Domain. A three level hierarchy of letters, words, and lines, was constructed, and additionally, a table was presented in which each cell, row, column, and entire table, were selectable by each user, as shown in FIG. 15, a schematic diagram illustrating an exemplary simulation of an ambiguous multiple object domain of text selection.

CAD Domain. Similar to the shapes domain, a CAD domain was presented with hierarchical shapes, but in a constellation typical to CAD software, as shown in FIG. 16, a schematic diagram illustrating an exemplary simulation of an ambiguous multiple object domain of a computer aided design (CAD) environment.

With respect to user performance during implementation of the present invention for the simulated human-computer interaction environment, the users needed a short period of time, typically, on the order of several minutes, for adjusting to the probabilistic nature of the system. After this adjustment, users were able to complete the tasks and reported a good sensation of human-computer interaction.

Among the different domains, the text selection was the most difficult, as expected form the nature of the interaction objects discussed above. However, even in this challenging human-computer interaction domain, users were able to comfortably access user targeted objects at all hierarchy levels and reported satisfaction. The containment hierarchy heuristic measure made it relatively easy to select sequences of user targeted objects at the same level. However, it required some 'mental energy' to break into a different hierarchy level. It was determined that the weight of the category of application context measures needed to be carefully adjusted according to the frequency users needed to select a consequent user targeted object at the different containment hierarchy levels.

While the invention has been described in conjunction with specific embodiments and examples thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for implicitly resolving pointing ambiguities in human-computer interaction, comprising the steps of:

(a) intending by a user to select a user targeted object from a plurality of at least two objects in an object domain displayed by a computer executing a computer application including a pointing mechanism featuring a pointer dynamically moveable throughout said object domain;

(b) moving by said user said pointer towards said user targeted object;

(c) estimating by said computer user movement continuation of said pointer towards said user targeted object;

(d) forming by said computer a set of candidate predicted user targeted objects according to parameters selected from the group consisting of pointer movement continuation parameters obtained from step (c) and pointer position parameters;

(e) predicting by said computer said user targeted object from said set of said candidate predicted user targeted objects according to at least one category of heuristic measures selected from the group consisting of implicit user pointing gesture measures, application context measures, and, number of computer suggestions of each predicted user targeted object measures, for generating by said computer a best predicted user targeted object;

(f) suggesting by said computer said best predicted user targeted object to said user; and (g) making a decision by said user, said decision is selected from the group consisting of accepting said computer suggested best predicted user targeted object as said user targeted object and as correct, and, rejecting said computer suggested best predicted user targeted object as not said user targeted object and as incorrect, whereby if said decision is said accepting said computer suggested best predicted user targeted object as said user targeted object, then said user performs an acceptance action using said pointing mechanism, indicative that the pointing ambiguities are resolved.

2. The method of claim 1, wherein said category of implicit user pointing gesture measures includes particular types of said heuristic measures selected from the group consisting of speed-accuracy tradeoff heuristic measures and exact pointer position heuristic measures.

3. The method of claim 1, wherein said category of implicit user pointing gesture measures includes particular types of said heuristic measures selected from the group consisting of total movement time (TMT) heuristic measures and amount of fine tuning (AFT) or tail length (TL) heuristic measures.

4. The method of claim 1, wherein said category of implicit user pointing gesture measures includes total movement time (TMT) heuristic measures based on applying Fitts' Law for determining a total movement time parameter, TMT, for performing a given task as a function of a size, W, of said user targeted object and a distance, A, of said user targeted object from a pre-determined reference point, where said Fitts' Law is described by a formula, said $TMT = a + b*\log_2[(2*A)/W]$, where said a and said b are empirically determined Fitts' Law parameters, said asterisk symbol, *, is a multiplication operator, and said factor $\log_2[(2*A)/W]$ is an index of difficulty describing difficulty for said performing said given task in 'bit' units.

5. The method of claim 1, wherein said category of implicit user pointing gesture measures includes total movement time (TMT) heuristic measures based on applying a reversed version of Fitts' Law for predicting a size, W, of said user targeted object from a total movement time parameter, TMT, for performing a given task and from a distance, A, of said user targeted object from a predetermined reference point, where said Fitts' Law is described by a formula, said $TMT = a + b*\log_2[(2*A)/W]$, where said a and said b are empirically determined Fitts' Law parameters, said asterisk symbol, *, is a multiplication operator, and said factor $\log_2[(2*A)/W]$ is an index of difficulty describing difficulty for said performing said given task in 'bit' units.

6. The method of claim 1, wherein said category of implicit user pointing gesture measures includes total movement time (TMT) heuristic measures based on applying a Shannon formulation of Fitts' Law for determining said total movement time, TMT, for performing a given task as a function of a size, W, of said user targeted object and a distance, A, of said user targeted object from a predetermined reference point, where said Shannon formulation of said Fitts' Law is described by a formula, said $TMT = a + b*\log_2[(A/W) + 1]$, where said a and said b are empirically determined Fitts' Law parameters, said asterisk symbol, *, is a multiplication operator, and said factor $\log_2[(A/W + 1)]$ is an index of difficulty describing difficulty for said performing said given task in 'bit' units.

7. The method of claim 1, wherein said category of implicit user pointing gesture measures includes total movement time (TMT) heuristic measures based on applying a reversed Shannon formulation of Fitts' Law for predicting a size, W, of said user targeted object from a total movement time parameter, TMT, for performing a given task and from a distance, A, of said user targeted object from a pre-determined reference point, where said Shannon formulation of said Fitts' Law is described by a formula, said $TMT = a + b*\log_2[(2*A)/W]$, where said a and said b are empirically determined Fitts' Law parameters, said asterisk symbol, *, is a multiplication operator, and said factor $\log_2[(2*A)/W]$ is an index of difficulty describing difficulty for said performing said given task in 'bit' units.

8. The method of claim 7, whereby extent by which said prediction of said size, W, of said user targeted object fits said reversed Shannon formulation of said Fitts' Law is defined as a fit written in a form, said $fit = ABS(TMT - a - b*\log_2[(A/W) + 1])$.

9. The method of claim 1, wherein said category of implicit user pointing gesture measures includes amount of fine tuning (AFT) or tail length (TL) heuristic measures for determining a tail length parameter, TL, of said user movement of said pointer as a function of a size, W, of said user targeted object and a distance, A, of said user targeted object from a predetermined reference point, where said tail length parameter is described by a formula, said $TL = a*W^2 + b*W + c$, where said a, said b, and said c, are empirically determined (AFT) or (TL) parameters and said asterisk symbol, *, is a multiplication operator.

10. The method of claim 1, whereby said category of implicit user pointing gesture measures includes particular types of exact pointer position heuristic measures selected from the group consisting of distance of said pointer from center of said user targeted object and direction of said moving by said user said pointer towards said user targeted object.

11. The method of claim 1, whereby said category of application context measures is based on context, of said selecting said user targeted object by said user, including any information external to said selecting and relevant to understanding said selecting said user targeted object.

12. The method of claim 1, whereby said category of application context measures includes a containment hierarchy particular type of said heuristic measures.

13. A method for implicitly resolving pointing ambiguities in human-computer interaction, comprising the steps of:
  (a) intending by a user to select a user targeted object from a plurality of at least two objects in an object domain displayed by a computer executing a computer application including a pointing mechanism featuring a pointer dynamically moveable throughout said object domain;
  (b) moving by said user said pointer towards said user targeted object;
  (c) selecting by said user a position of said pointer located in a vicinity of said user targeted object;
  (d) estimating by said computer user movement continuation of said pointer towards said user targeted object;
  (e) forming by said computer a set of candidate predicted user targeted objects according to parameters selected from the group consisting of pointer movement continuation parameters obtained from step (d) and pointer position parameters;
  (f) predicting by said computer said user targeted object from said set of said candidate predicted user targeted objects according to at least one category of heuristic measures selected from the group consisting of implicit user pointing gesture measures and application context measures, for generating by said computer a best predicted user targeted object; and
  (g) selecting by said computer said computer generated best predicted user targeted object, whereby if said computer generated best predicted user targeted object is said user targeted object, then the pointing ambiguities are resolved.

14. The method of claim 13, wherein said category of implicit user pointing gesture measures includes particular types of said heuristic measures selected from the group consisting of speed-accuracy tradeoff heuristic measures and exact pointer position heuristic measures.

15. The method of claim 13, wherein said category of implicit user pointing gesture measures includes particular types of said heuristic measures selected from the group consisting of total movement time (TMT) heuristic measures and amount of fine tuning (AFT) or tail length (TL) heuristic measures.

16. The method of claim 13, wherein said category of implicit user pointing gesture measures includes total movement time (TMT) heuristic measures based on applying Fitts' Law for determining a total movement time parameter, TMT, for performing a given task as a function of a size, W, of said user targeted object and a distance, A, of said user targeted object from a pre-determined reference point, where said Fitts' Law is described by a formula, said TMT=a+b*log$_2$[(2*A)/W], where said a and said b are empirically determined Fitts' Law parameters, said asterisk symbol, *, is a multiplication operator, and said factor log$_2$[(2*A)/W] is an index of difficulty describing difficulty for said performing said given task in 'bit' units.

17. The method of claim 13, wherein said category of implicit user pointing gesture measures includes total movement time (TMT) heuristic measures based on applying a reversed version of Fitts' Law for predicting a size, W, of said user targeted object from a total movement time parameter, TMT, for performing a given task and from a distance, A, of said user targeted object from a pre-determined reference point, where said Fitts' Law is described by a formula, said TMT=a+b*log$_2$[(2*A)/W], where said a and said b are empirically determined Fitts' Law parameters, said asterisk symbol, *, is a multiplication operator, and said factor log$_2$[(2*A)/W] is an index of difficulty describing difficulty for said performing said given task in 'bit' units.

18. The method of claim 13, wherein said category of implicit user pointing gesture measures includes total movement time (TMT) heuristic measures based on applying a Shannon formulation of Fitts' Law for determining said total movement time, TMT, for performing a given task as a function of a size, W, of said user targeted object and a distance, A, of said user targeted object from a predetermined reference point, where said Shannon formulation of said Fitts' Law is described by a formula, said TMT=a+b*log$_2$[(A/W)+1], where said a and said b are empirically determined Fitts' Law parameters, said asterisk symbol, *, is a multiplication operator, and said factor log$_2$[(A/W)+1] is an index of difficulty describing difficulty for said performing said given task in 'bit' units.

19. The method of claim 13, wherein said category of implicit user pointing gesture measures includes total movement time (TMT) heuristic measures based on applying a reversed Shannon formulation of Fitts' Law for predicting a size, W, of said user targeted object from a total movement time parameter, TMT, for performing a given task and from a distance, A, of said user targeted object from a pre-determined reference point, where said Shannon formulation of said Fitts' Law is described by a formula, said TMT=a+b*log$_2$[(2*A)/W], where said a and said b are empirically determined Fitts' Law parameters, said asterisk symbol, *, is a multiplication operator, and said factor log$_2$[(2*A)/W] is an index of difficulty describing difficulty for said performing said given task in 'bit' units.

20. The method of claim 19, whereby extent by which said prediction of said size, W, of said user targeted object fits said reversed Shannon formulation of said Fitts' Law is defined as a fit written in a form, said fit=ABS(TMT−a−b*log$_2$[(A/W)+1].

21. The method of claim 13, wherein said category of implicit user pointing gesture measures includes amount of fine tuning (AFT) or tail length (TL) heuristic measures for determining a tail length parameter, TL, of said user movement of said pointer as a function of a size, W, of said user targeted object and a distance, A, of said user targeted object from a pre-determined reference point, where said tail length parameter is described by a formula, said TL=a*W$^2$+b*W+c, where said a, said b, and said c, are empirically determined (AFT) or (TL) parameters and said asterisk symbol, *, is a multiplication operator.

22. The method of claim 13, whereby said category of implicit user pointing gesture measures includes particular types of exact pointer position heuristic measures selected from the group consisting of distance of said pointer from center of said user targeted object and direction of said moving by said user said pointer towards said user targeted object.

23. The method of claim 13, whereby said category of application context measures is based on context, of said selecting said user targeted object by said user, including any information external to said selecting and relevant to understanding said selecting said user targeted object.

24. The method of claim 13, whereby said category of application context measures includes a containment hierarchy particular type of said heuristic measures.

25. A method for implicitly resolving pointing ambiguities in human-computer interaction, comprising the steps of:
  (a) intending by a user to select a user targeted object from a plurality of at least two objects in an object domain displayed by a computer executing a computer application including a pointing mechanism featuring a pointer dynamically moveable throughout said object domain;

(b) moving by said user said pointer towards said user targeted object;

(c) implicitly resolving by said computer the pointing ambiguities by implicitly analyzing user movements of said pointer towards said user targeted object located in said object domain and predicting said user targeted object, whereby said implicitly analyzing and predicting are performed by using at least one category of heuristic measures selected from the group consisting of implicit user pointing gesture measures, application context measures, and number of computer suggestions of each best predicted user targeted object measures;

wherein said category of implicit user pointing gesture measures includes total movement time (TMT) heuristic measures based on applying a reversed Shannon formulation of Fitts' Law for predicting a size, W, of said user targeted object from a total movement time parameter, TMT, for performing a given task and from a distance, A, of said user targeted object from a predetermined reference point, where said Shannon formulation of said Fitts' Law is described by a formula, said TMT=a+b*$\log_2$[(2*A)/W], where said a and said b are empirically determined Fitts' Law parameters, said asterisk symbol, *, is a multiplication operator, and said factor $\log_2$[(2*A)/W] is an index of difficulty describing difficulty for said performing said given task in 'bit' units;

and wherein extent by which said prediction of said size, W, of said user targeted object fits said reversed Shannon formulation of said Fitts' Law is defined as a fit written in a form, said fit=ABS(TMT−a−b*$\log_2$[(A/W)+1]).

26. The method of claim 25, wherein said category of implicit user pointing gesture measures also includes particular types of said heuristic measures selected from the group consisting of speed-accuracy tradeoff heuristic measures and exact pointer position heuristic measures.

27. The method of claim 25, wherein said category of implicit user pointing gesture measures also includes particular types of said heuristic measures selected from the group consisting of total movement time (TMT) heuristic measures and amount of fine tuning (AFT) or tail length (TL) heuristic measures.

28. The method of claim 25, wherein said category of implicit user pointing gesture measures also includes total movement time (TMT) heuristic measures based on applying Fitts' Law for determining a total movement time parameter, TMT, for performing a given task as a function of a size, W, of said user targeted object and a distance, A, of said user targeted object from a predetermined reference point, where said Fitts' Law is described by a formula, said TMT=a+b*$\log_2$[(2*A)/W], where said a and said b are empirically determined Fitts' Law parameters, said asterisk symbol, *, is a multiplication operator, and said factor $\log_2$[(2*A)/W] is an index of difficulty describing difficulty for said performing said given task in 'bit' units.

29. The method of claim 25, wherein said category of implicit user pointing gesture measures also includes total movement time (TMT) heuristic measures based on applying a reversed version of Fitts' Law for predicting a size, W, of said user targeted object from a total movement time parameter, TMT, for performing a given task and from a distance, A, of said user targeted object from a predetermined reference point, where said Fitts' Law is described by a formula, said TMT=a+b*$\log_2$[(2*A)/W], where said a and said b are empirically determined Fitts' Law parameters, said asterisk symbol, *, is a multiplication operator, and said factor $\log_2$[(2*A)/W] is an index of difficulty describing difficulty for said performing said given task in 'bit' units.

30. The method of claim 25, wherein said category of implicit user pointing gesture measures also includes total movement time (TMT) heuristic measures based on applying a Shannon formulation of Fitts' Law for determining said total movement time, TMT, for performing a given task as a function of a size, W, of said user targeted object and a distance, A, of said user targeted object from a predetermined reference point, where said Shannon formulation of said Fitts' Law is described by a formula, said TMT=a+b*$\log_2$[(A/W)+1], where said a and said b are empirically determined Fitts' Law parameters, said asterisk symbol, *, is a multiplication operator, and said factor $\log_2$[(A/W)+1] is an index of difficulty describing difficulty for said performing said given task in 'bit' units.

31. The method of claim 25, whereby said category of implicit user pointing gesture measures also includes particular types of exact pointer position heuristic measures selected from the group consisting of distance of said pointer from center of said user targeted object and direction of said moving by said user said pointer towards said user targeted object.

32. The method of claim 25, whereby said category of application context measures is based on context, of said selecting said user targeted object by said user, including any information external to said selecting and relevant to understanding said selecting said user targeted object.

33. The method of claim 25, whereby said category of application context measures includes a containment hierarchy particular type of said heuristic measures.

34. The method of claim 25, wherein said pointing ambiguities include an overlapping object ambiguity.

35. The method of claim 25, wherein said pointing ambiguities include a composite object ambiguity.

36. A method for implicitly resolving pointing ambiguities in human-computer interaction, comprising the steps of:

(a) intending by a user to select a user targeted object from a plurality of at least two objects in an object domain displayed by a computer executing a computer application including a pointing mechanism featuring a pointer dynamically moveable throughout said object domain;

(b) moving by said user said pointer towards said user targeted object;

(c) implicitly resolving by said computer the pointing ambiguities by implicitly analyzing user movements of said pointer towards said user targeted object located in said object domain and predicting said user targeted object, whereby said implicitly analyzing and predicting are performed by using at least one category of heuristic measures selected from the group consisting of implicit user pointing gesture measures application context measures, and number of computer suggestions of each best predicted user targeted object measures;

wherein said category of implicit user pointing gesture measures includes amount of fine tuning (AFT) or tail length (TL) heuristic measures for determining a tail length parameter, TL, of said user movement of said pointer as a function of a size, W, of said user targeted object and a distance, A, of said user targeted object from a predetermined reference point, where said tail length parameter is described by a formula, said TL=a*$W^2$+b*W+c, where said a, said b, and said c, are empirically determined (AFT) or (TL) parameters and said asterisk symbol, *, is a multiplication operator.

37. A method for implicitly resolving pointing ambiguities in human-computer interaction, comprising the steps of:
   (a) intending by a user to select a user targeted object from a plurality of at least two objects in an object domain displayed by a computer executing a computer application including a pointing mechanism featuring a pointer dynamically moveable throughout said object domain;
   (b) moving by said user said pointer towards said user targeted object;
   (c) implicitly resolving by said computer the pointing ambiguities by implicitly analyzing user movements of said pointer towards said user targeted object located in said object domain and predicting said user targeted object, whereby said implicitly analyzing and predicting are performed by using at least one category of heuristic measures selected from the group consisting of implicit user pointing gesture measures and application context measures;
wherein said category of implicit user pointing gesture measures includes total movement time (TMT) heuristic measures based on applying a reversed Shannon formulation of Fitts' Law for predicting a size, W, of said user targeted object from a total movement time parameter, TMT, for performing a given task and from a distance, A, of said user targeted object from a pre-determined reference point, where said Shannon formulation of said Fitts' Law is described by a formula, said $TMT=a+b*\log_2[(2*A)/W]$ extent by which said prediction of said size, W, of said user targeted object fits said reversed Shannon formulation of said Fitts' Law is defined as a fit written in a form, said $fit=ABS(TMT-a-b*\log_2[(A/W)+1])$, where said a and said b are empirically determined Fitts' Law parameters, said asterisk symbol, *, is a multiplication operator, and said factor $\log_2[(2*A)/W]$ is an index of difficulty describing difficulty for said performing said given task in 'bit' units;
and wherein extent by which said prediction of said size, W, of said user targeted object fits said reversed Shannon formulation of said Fitts' Law is defined as a fit written in a form, said $fit=ABS(TMT-a-b*\log_2[(A/W)+1])$.

38. The method of claim 37, wherein said category of implicit user pointing gesture measures also includes particular types of said heuristic measures selected from the group consisting of speed-accuracy tradeoff heuristic measures and exact pointer position heuristic measures.

39. The method of claim 37, wherein said category of implicit user pointing gesture measures also includes particular types of said heuristic measures selected from the group consisting of total movement time (TMT) heuristic measures and amount of fine tuning (AFT) or tail length (TL) heuristic measures.

40. The method of claim 37, wherein said category of implicit user pointing gesture measures also includes total movement time (TMT) heuristic measures based on applying Fitts' Law for determining a total movement time parameter, TMT, for performing a given task as a function of a size, W, of said user targeted object and a distance, A, of said user targeted object from a pre-determined reference point, where Fitts' Law is described by a formula, said $TMT=a+b*\log_2[(2*A)/W]$, where said a and said b are empirically determined Fitts' Law parameters, said asterisk symbol, *, is a multiplication operator, and said factor $\log_2[(2*A)/W]$ is an index of difficulty describing difficulty for said performing said given task in 'bit' units.

41. The method of claim 37, wherein said category of implicit user pointing gesture measures also includes total movement time (TMT) heuristic measures based on applying a reversed version of Fitts' Law for predicting a size, W, of said user targeted object from a total movement time parameter, TMT, for performing a given task and from a distance, A, of said user targeted object from a predetermined reference point, where said Fitts' Law is described by a formula, said $TMT=a+b*\log_2[(2*A)/W-]$, where said a and said b are empirically determined Fitts' Law parameters, said asterisk symbol, *, is a multiplication operator, and said factor $\log_2[(2*A)/W]$ is an index of difficulty describing difficulty for said performing said given task in 'bit' units.

42. The method of claim 37, wherein said category of implicit user pointing gesture measures also includes total movement time (TMT) heuristic measures based on applying a Shannon formulation of Fitts' Law for determining said total movement time, TMT, for performing a given task as a function of a size, W, of said user targeted object and a distance, A, of said user targeted object from a predetermined reference point, where said Shannon formulation of said Fitts' Law is described by a formula, said $TMT=a+b*\log_2[(A/W)+1]$, where said a and said b are empirically determined Fitts' Law parameters, said asterisk symbol, *, is a multiplication operator, and said factor $\log_2[(A/W+1)]$ is an index of difficulty describing difficulty for said performing said given task in 'bit' units.

43. The method of claim 37, whereby said category of implicit user pointing gesture measures also includes particular types of exact pointer position heuristic measures selected from the group consisting of distance of said pointer from center of said user targeted object and direction of said moving by said user said pointer towards said user targeted object.

44. The method of claim 37, whereby said category of application context measures is based on context, of said selecting said user targeted object by said user, including any information external to said selecting and relevant to understanding said selecting said user targeted object.

45. The method of claim 37, whereby said category of application context measures includes a containment hierarchy particular type of said heuristic measures.

46. The method of claim 37, wherein said pointing ambiguities include an overlapping object ambiguity.

47. The method of claim 37, wherein said pointing ambiguities include a composite object ambiguity.

48. A method for implicitly resolving pointing ambiguities in human-computer interaction, comprising the steps of:
   (a) intending by a user to select a user targeted object from a plurality of at least two objects in an object domain displayed by a computer executing a computer application including a pointing mechanism featuring a pointer dynamically moveable throughout said object domain;
   (b) moving by said user said pointer towards said user targeted object;
   (c) implicitly resolving by said computer the pointing ambiguities by implicitly analyzing user movements of said pointer towards said user targeted object located in said object domain and predicting said user targeted object, whereby said implicitly analyzing and predicting are performed by using at least one category of heuristic measures selected from the group consisting of implicit user pointing gesture measures and application context measures;
wherein said category of implicit user pointing gesture measures includes amount of fine tuning (AFT) or tail length (TL) heuristic measures for determining a tail length parameter, TL, of said user movement of said pointer as a function of a size, W, of said user targeted object and a distance, A, of said user targeted object from a pre-determined reference point, where said tail length parameter is described by a formula, said TL=a*$W^2$+b*W+c, where said a, said b, and said c, are empirically determined (AFT) or (TL) parameters and said asterisk symbol, *, is a multiplication operator.

49. A system for implicitly resolving pointing ambiguities in human-computer interaction, comprising:

(a) a user intending to select a user targeted object from a plurality of at least two objects in an object domain;

(b) a pointing mechanism featuring a pointer dynamically moveable throughout said object domain and controllable by said user; and (c) a computer displaying said plurality of said at least two objects in said object domain and executing a computer application including said pointer dynamically moveable throughout said object domain, whereby said computer implicitly resolves the pointing ambiguities by implicitly analyzing user movements of said pointer towards said user targeted object located in said object domain and predicting said user targeted object, said implicitly analyzing and predicting are performed by using at least one category of heuristic measures selected from the group consisting of implicit user pointing gesture measures, application context measures, and number of computer suggestions of each best predicted user targeted object measures;

wherein said category of implicit user pointing gesture measures includes total movement time (TMT) heuristic measures based on applying a reversed Shannon formulation of Fitts' Law for predicting a size, W, of said user targeted object from a total movement time parameter, TMT, for performing a given task and from a distance, A, of said user targeted object from a predetermined reference point, where said Shannon formulation of said Fitts' Law is described by a formula, said TMT=a+b*$\log_2$[(2*A)/W], where said a and said b are empirically determined Fitts' Law parameters, said asterisk symbol, *, is a multiplication operator, and said factor $\log_2$[(2*A)/W] is an index of difficulty describing difficulty for said performing said given task in 'bit' units; and wherein extent by which said prediction of said size, W, of said user targeted object fits said reversed Shannon formulation of said Fitts' Law is defined as a fit written in a form, said fit=ABS(TMT−a−b*$\log_2$[(A/W)+1]).

50. The system of claim 49, wherein said category of implicit user pointing gesture measures also includes particular types of said heuristic measures selected from the group consisting of speed-accuracy tradeoff heuristic measures and exact pointer position heuristic measures.

51. The system of claim 49, wherein said category of implicit user pointing gesture measures also includes particular types of said heuristic measures selected from the group consisting of total movement time (TMT) heuristic measures and amount of fine tuning (AFT) or tail length (TL) heuristic measures.

52. The system of claim 49, wherein said category of implicit user pointing gesture measures also includes total movement time (TMT) heuristic measures based on applying Fitts' Law for determining a total movement time parameter, TMT, for performing a given task as a function of a size, W, of said user targeted object and a distance, A, of said user targeted object from a pre-determined reference point, where said Fitts' Law is described by a formula, said TMT=a+b*$\log_2$[(2*A)/W], where said a and said b are empirically determined Fitts' Law parameters, said asterisk symbol, *, is a multiplication operator, and said factor $\log_2$[(2*A)/W] is an index of difficulty describing difficulty for said performing said given task in 'bit' units.

53. The system of claim 49, wherein said category of implicit user pointing gesture measures also includes total movement time (TMT) heuristic measures based on applying a reversed version of Fitts' Law for predicting a size, W, of said user targeted object from a total movement time parameter, TMT, for performing a given task and from a distance, A, of said user targeted object from a pre-determined reference point, where said Fitts' Law is described by a formula, said TMT=a+b*$\log_2$[(2*A)/W], where said a and said b are empirically determined Fitts' Law parameters, said asterisk symbol, *, is a multiplication operator, and said factor $\log_2$[(2*A)/W] is an index of difficulty describing difficulty for said performing said given task in 'bit' units.

54. The system of claim 49, wherein said category of implicit user pointing gesture measures also includes total movement time (TMT) heuristic measures based on applying a Shannon formulation of Fitts' Law for determining said total movement time, TMT, for performing a given task as a function of a size, W, of said user targeted object and a distance, A, of said user targeted object from a pre-determined reference point, where said Shannon formulation of said Fitts' Law is described by a formula, said TMT=a+b*$\log_2$[(A/W)+1], where said a and said b are empirically determined Fitts' Law parameters, said asterisk symbol, *, is a multiplication operator, and said factor $\log_2$[(A/W)+1] is an index of difficulty describing difficulty for said performing said given task in 'bit' units.

55. The system of claim 49, whereby said category of implicit user pointing gesture measures also includes particular types of exact pointer position heuristic measures selected from the group consisting of distance of said pointer from center of said user targeted object and direction of said moving by said user said pointer towards said user targeted object.

56. The system of claim 49, whereby said category of application context measures is based on context, of said selecting said user targeted object by said user, including any information external to said selecting and relevant to understanding said selecting said user targeted object.

57. The system of claim 49, whereby said category of application context measures includes a containment hierarchy particular type of said heuristic measures.

58. The system of claim 49, wherein said pointing ambiguities include an overlapping object ambiguity.

59. The system of claim 49, wherein said pointing ambiguities include a composite object ambiguity.

60. A system for implicitly resolving pointing ambiguities in human-computer interaction, comprising:

(a) a user intending to select a user targeted object from a plurality of at least two objects in an object domain;

(b) a pointing mechanism featuring a pointer dynamically moveable throughout said object domain and controllable by said user; and (c) a computer displaying said plurality of said at least two objects in said object domain and executing a computer application including said pointer dynamically moveable throughout said object domain, whereby said computer implicitly resolves the pointing ambiguities by implicitly analyzing user movements of said pointer towards said user targeted object located in said object domain and predicting said user targeted object, said implicitly analyzing and predicting are performed by using at least one category of heuristic measures selected from the group consisting of implicit user pointing gesture measures, application context measures, and number of computer suggestions of each best predicted user targeted object measures;

wherein said category of implicit user pointing gesture measures includes amount of fine tuning (AFT) or tail length (TL) heuristic measures for determining a tail length parameter, TL, of said user movement of said pointer as a function of a size, W, of said user targeted object and a distance, A, of said user targeted object from a pre-determined reference point, where said tail length parameter is described by a formula, said $TL=a*W^2+b*W+c$, where said a, said b, and said c, are empirically determined (AFT) or (TL) parameters and said asterisk symbol, *, is a multiplication operator.

61. A system for implicitly resolving pointing ambiguities in human-computer interaction, comprising:
    (a) a user intending to select a user targeted object from a plurality of at least two objects in an object domain;
    (b) a pointing mechanism featuring a pointer dynamically moveable throughout said object domain and controllable by said user; and
    (c) a computer displaying said plurality of said at least two objects in said object domain and executing a computer application including said pointer dynamically moveable throughout said object domain, whereby said computer implicitly resolves the pointing ambiguities by implicitly analyzing user movements of said pointer towards said user targeted object located in said object domain and predicting said user targeted object, said implicitly analyzing and predicting are performed by using at least one category of heuristic measures selected from the group consisting of implicit user pointing gesture measures and application context measures;

wherein said category of implicit user pointing gesture measures includes total movement time (TMT) heuristic measures based on applying a reversed Shannon formulation of Fitts' Law for predicting a size, W, of said user targeted object from a total movement time parameter, TMT, for performing a given task and from a distance, A, of said user targeted object from a pre-determined reference point, where said Shannon formulation of said Fitts' Law is described by a formula, said $TMT=a+b*\log_2[(2*A)/W]$, where said a and said b are empirically determined Fitts' Law parameters, said asterisk symbol, *, is a multiplication operator, and said factor $\log_2[(2*A)/W]$ is an index of difficulty describing difficulty for said performing said given task in 'bit' units; and wherein extent by which said prediction of said size, W, of said user targeted object fits said reversed Shannon formulation of said Fitts' Law is defined as a fit written in a form, said $fit=ABS(TMT-a-b*\log_2[(A/W)+1])$.

62. The system of claim 61, wherein said category of implicit user pointing gesture measures also includes particular types of said heuristic measures selected from the group consisting of speed-accuracy tradeoff heuristic measures and exact pointer position heuristic measures.

63. The system of claim 61, wherein said category of implicit user pointing gesture measures also includes particular types of said heuristic measures selected from the group consisting of total movement time (TMT) heuristic measures and amount of fine tuning (AFT) or tail length (TL) heuristic measures.

64. The system of claim 61, wherein said category of implicit user pointing gesture measures also includes total movement time (TMT) heuristic measures based on applying Fitts' Law for determining a total movement time parameter, TMT, for performing a given task as a function of a size, W, of said user targeted object and a distance, A, of said user targeted object from a pre-determined reference point, where said Fitts' Law is described by a formula, said $TMT=a+b*\log_2[(2*A)/W]$, where said a and said b are empirically determined Fitts' Law parameters, said asterisk symbol, *, is a multiplication operator, and said factor $\log_2[(2*A)/W]$ is an index of difficulty describing difficulty for said performing said given task in 'bit' units.

65. The system of claim 61, wherein said category of implicit user pointing gesture measures also includes total movement time (TMT) heuristic measures based on applying a reversed version of Fitts' Law for predicting a size, W, of said user targeted object from a total movement time parameter, TMT, for performing a given task and from a distance, A, of said user targeted object from a predetermined reference point, where said Fitts' Law is described by a formula, said $TMT=a+b*\log_2[(2*A)/W]$, where said a and said b are empirically determined Fitts' Law parameters, said asterisk symbol, *, is a multiplication operator, and said factor $\log_2[(2*A)/W]$ is an index of difficulty describing difficulty for said performing said given task in 'bit' units.

66. The system of claim 61, wherein said category of implicit user pointing gesture measures also includes total movement time (TMT) heuristic measures based on applying a Shannon formulation of Fitts' Law for determining said total movement time, TMT, for performing a given task as a function of a size, W, of said user targeted object and a distance, A, of said user targeted object from a pre-determined reference point, where said Shannon formulation of said Fitts' Law is described by a formula, said $TMT=a+b*\log_2[(A/W)+1]$, where said a and said b are empirically determined Fitts' Law parameters, said asterisk symbol, *, is a multiplication operator, and said factor $\log_2[(A/W)+1]$ is an index of difficulty describing difficulty for said performing said given task in 'bit' units.

67. The system of claim 61, whereby said category of implicit user pointing gesture measures also includes particular types of exact pointer position heuristic measures selected from the group consisting of distance of said pointer from center of said user targeted object and direction of said moving by said user said pointer towards said user targeted object.

68. The system of claim 61, whereby said category of application context measures is based on context, of said selecting said user targeted object by said user, including any information external to said selecting and relevant to understanding said selecting said user targeted object.

69. The system of claim 61, whereby said category of application context measures includes a containment hierarchy particular type of said heuristic measures.

70. The system of claim 61, wherein said pointing ambiguities include an overlapping object ambiguity.

71. The system of claim 61, wherein said pointing ambiguities include a composite object ambiguity.

72. A system for implicitly resolving pointing ambiguities in human-computer interaction, comprising:
    (a) a user intending to select a user targeted object from a plurality of at least two objects in an object domain;
    (b) a pointing mechanism featuring a pointer dynamically moveable throughout said object domain and controllable by said user, and
    (c) a computer displaying said plurality of said at least two objects in said object domain and executing a computer application including said pointer dynamically moveable throughout said object domain, whereby said computer implicitly resolves the pointing ambiguities by implicitly analyzing user movements of said pointer towards said user targeted object located in said object domain and predicting said user targeted object, said implicitly analyzing and predicting are performed by using at least one category of heuristic measures selected from the group consisting of implicit user pointing gesture measures and application context measures;

wherein said category of implicit user pointing gesture measures includes amount of fine tuning (AFT) or tail length (TL) heuristic measures for determining a tail length parameter, TL, of said user movement of said pointer as a function of a size, W, of said user targeted object and a distance, A, of said user targeted object from a predetermined reference point, where said tail length parameter is described by a formula, said $TL = a*W^2 + b*W + c$, where said a, said b, and said c, are empirically determined (AFT) or (TL) parameters and said asterisk symbol, *, is a multiplication operator.

* * * * *